(12) United States Patent
Urwin et al.

(10) Patent No.: US 9,266,037 B2
(45) Date of Patent: Feb. 23, 2016

(54) THERMAL DISTILLATION SYSTEM AND PROCESS

(75) Inventors: Peter M. Urwin, Victoria (AU); Michael John O'Connell, Victoria (AU); Kathryn Moira Wilson, Victoria (AU); Glenn Rees, Victoria (AU)

(73) Assignee: Phoenix Water, George Town (KY)

( * ) Notice: Subject to any disclaimer, the term of this patent is extended or adjusted under 35 U.S.C. 154(b) by 840 days.

(21) Appl. No.: 13/497,180

(22) PCT Filed: Sep. 21, 2010
(Under 37 CFR 1.47)

(86) PCT No.: PCT/AU2010/001242
§ 371 (c)(1),
(2), (4) Date: May 31, 2012

(87) PCT Pub. No.: WO2011/032237
PCT Pub. Date: Mar. 24, 2011

(65) Prior Publication Data
US 2012/0241308 A1 Sep. 27, 2012

(30) Foreign Application Priority Data
Sep. 21, 2009 (AU) ................................ 2009904565

(51) Int. Cl.
*C02F 1/04* (2006.01)
*B01D 3/14* (2006.01)
(Continued)

(52) U.S. Cl.
CPC ............... *B01D 3/143* (2013.01); *B01D 3/007* (2013.01); *B01D 3/148* (2013.01); *B01D 3/343* (2013.01); *B01D 3/346* (2013.01); *C01D 3/06* (2013.01);
(Continued)

(58) Field of Classification Search
CPC ........ B01D 3/007; B01D 3/143; B01D 3/148; B01D 3/343; B01D 3/346; C02F 1/048; C02F 2103/08
USPC ......................................... 203/10, 11; 95/204
See application file for complete search history.

(56) References Cited

U.S. PATENT DOCUMENTS 3,345,272 A * 10/1967 Collins ........................... 203/11
3,627,646 A    12/1971 Osdor
(Continued)

FOREIGN PATENT DOCUMENTS

CN          1546386      11/2004
CN         201169543     12/2008
(Continued)

*Primary Examiner* — Renee E Robinson
*Assistant Examiner* — Jonathan Miller
(74) *Attorney, Agent, or Firm* — Locke Lord LLP

(57) ABSTRACT

A thermal distillation system comprises heating means and cooling means arranged to heat and cool, respectively, treatable liquid in a liquid circuit having a first section between a heating means output and cooling means input, and a second section between an a cooling means output and heating means input, and further comprises distillation stages, each including an evaporator on the first section and a condenser on the second section in heat exchange relationship with liquid in the second section, a carrier gas circuit, on which the evaporator and condenser are arranged, and an output for outputting liquid extracted, wherein the stages are arranged such that their evaporators are disposed along the first section in a direction from the heating means to the cooling means and their condensers are disposed in corresponding order along the second section in a direction from the heating means to the cooling means.

14 Claims, 22 Drawing Sheets

(51) Int. Cl.
*B01D 3/34* (2006.01)
*B01D 3/00* (2006.01)
*C01D 3/06* (2006.01)
*C02F 103/08* (2006.01)

(52) U.S. Cl.
CPC ............ C02F 1/048 (2013.01); *C02F 2103/08* (2013.01); *Y02W 10/37* (2015.05)

(56) References Cited

U.S. PATENT DOCUMENTS

| | | | |
|---|---|---|---|
| 3,860,492 A | 1/1975 | Lowi, Jr. et al. | |
| 6,919,000 B2 * | 7/2005 | Klausner et al. | 203/10 |
| 7,225,620 B2 * | 6/2007 | Klausner et al. | 60/641.1 |
| 7,431,805 B2 * | 10/2008 | Beckman | 203/2 |
| 2002/0166758 A1 * | 11/2002 | Vinz | 203/2 |
| 2008/0164136 A1 | 7/2008 | Ophir et al. | |

FOREIGN PATENT DOCUMENTS

| | | |
|---|---|---|
| DE | 519123 | 2/1931 |
| EP | 1770068 | 9/2006 |
| EP | 1770068 | 4/2007 |
| FR | 2867770 (A1) | 9/2005 |
| GB | 1040042 | 8/1966 |
| GB | 1147726 | 4/1969 |
| GB | 1232309 | 5/1971 |
| GB | 1353444 | 5/1974 |
| GB | 1359205 | 7/1974 |
| GB | 2413321 | 10/2005 |
| WO | WO 93/10048 | 5/1993 |
| WO | WO 02/087722 | 11/2002 |
| WO | WO 2005/075045 | 8/2005 |

* cited by examiner

Table 1

| Heating and Cooling Input Temperatures | | |
|---|---|---|
| Hot Side Temp out | 70.0 | °C |
| Cold Side Temp in | 23.0 | °C |
| Temp Diff | 6.4 | °C |

Table 2

| Heating and Coolant Flow | | |
|---|---|---|
| Water on Cold Side | 5.00 | L/s |
| VFR Water on Hot Side | 5.00 | L/s |
| Flow Ratio | 1.00 | |
| Water Flow | | |
| Water VFR per Unit | 5.00 | L/s |

Table 3

| Cool Module Characteristics | | |
|---|---|---|
| Air Flow | | |
| Humidifier | 1.2 | m (length) |
| | 0.9 | m (width) |
| CSA | 1.08 | m2 |
| Air Speed | 2.41 | m/s |
| Air VFR per Unit | 2.60 | m3/s |
| Min. Internal Appr. Temp. | 2.00 | °C |
| CSA of Dehumidifier | 1.08 | m2 |
| Air Speed | 2.41 | m/s |
| Min. Appr. Temp. | 2.00 | °C |

FIGURE 2B

Table 4

| Hot Module Characteristics | | |
|---|---|---|
| Air Flow | | |
| Humidifier | 1.2 | m (length) |
| | 0.9 | m (width) |
| CSA | 1.08 | m2 |
| Air Speed | 1.06 | m/s |
| Air VFR per Unit | 1.14 | m3/s |
| Min. Internal Appr. Temp. | 2.00 | °C |
| CSA of Dehumidifier | 1.08 | m2 |
| Air Speed | 1.06 | m/s |
| Min. Appr. Temp. | 2.00 | °C |

FIGURE 2B - Continued

Table 5

| Constants | | | | |
|---|---|---|---|---|
| Flow Path | SG | Cp [kJ/kgK] | MFR [kg/s] | C [kW/K] |
| Cool Air Loop Evap | | 7.57 | 2.76 | 20.89 |
| Hot Air Loop | | 20.75 | 1.01 | 20.94 |
| Water Loop | 1.000 | 4.186 | 5.00 | 20.93 |
| Cold Loop | 1.000 | 4.186 | 5.00 | 20.93 |
| Hot Loop | 1.000 | 4.186 | 5.00 | 20.93 |
| Cool L/G Ratio | 1.812635127 | | Cool cL/G Ratio | 7.59 |
| Hot L/G Ratio | 4.95510712 | | Hot cL/G Ratio | 20.74 |

Saturated Salt Water    1.225    3.23

Table 6

| Thermal Performance | Evaporation Rate | 5.6% |
|---|---|---|
| GOR 6.01 | kW /m² CSA Cool | 391.4 |
| 133.44 kWh/kL | kW /m² CSA Hot | 356.3 |

Water Load Required 16.67 m³/hr/m² CSA

FIGURE 2B - Continued

Demonstration Unit - Symbol Key

| Symbol | Description | Symbol | Description |
|---|---|---|---|
| HC.2 | Humidification Chamber | PLC | Programmable Logic Controller |
| WRC.2 | Water Recovery Chamber | 4-20mA | Milli-Amp Power Supply |
| | Centrifugal Blower | VFD | Variable Frequency Drive |
| | Simulated Cooling Source | ○ | Symbol for Instrumentation |
| | Simulated Heating Source | | Gas Flow |
| | Liquid & Slurry Storage Tanks | | Liquid Flow |
| | | | Weight Flow |
| | Suspended Solids Filter | | Expansion Joint |
| | | | Pipe Insulation |
| | Liquid to Liquid Heat Exchanger | | Ball Valve |
| | Hydro-cyclone Separator | | Three-Way Valve |
| | Centrifugal Pump | | Non-Return Valve |
| | Mechanical Centrifuge | | Quick Couple Connection |
| | Air Eliminator | | Manually Actuated |
| M | Electric Motor | | Butterfly Valve |
| | 415 Volt - 50 Hz - 3 Phase power | | Solids Slurry Diverter |
| | Alternating Current (AC) Power Supply | | |
| | Direct Current (DC) 24 Volt Power Supply | | |

FIGURE 3

THERMAL DISTILLATION SYSTEM AND PROCESS

FIELD OF THE INVENTION

The present invention relates generally to industrial scale treatable liquid treatment and specifically the treatment of waste water streams from industrial processes. More particularly, the invention relates to apparatus and processes which operate by distilling a liquid from a treatable liquid stream containing dissolved solids. Preferred embodiments of the invention further employ an associated solids recovery or separation process.

BACKGROUND OF THE INVENTION

Almost invariably, industrial manufacturing processes produce waste liquid streams. This is particularly the case for industries such as those involved in power, mineral, paper, petrochemical, pharmaceutical, food processing, and electronic component manufacture, just to name a few. Most of the waste liquid streams emanating from such processes are waste water streams which are characterised by a range of impurities (and concentrations thereof) which are particular to the specific manufacturing process. For instance, the production of potable water through filtration based desalination of sea water produces a waste water stream which is characterised by having a high concentration of various salts.

Traditionally, a popular way of treating waste water streams has been to separate the solid impurities from the water by evaporation. This is typically achieved on an industrial scale by discharging the waste water stream into large evaporation ponds. The major disadvantages of doing so, however, come from the fact this process is extremely slow, allowing for the possibility that toxic impurities may leach into the soil and/or enter a subterranean water table. Also, when new industrial scale plants are designed, it is often quite difficult to accommodate space for suitably sized evaporation ponds to meet the demands of the industrial process.

Many countries around the world have implemented strict guidelines as to the processing of waste water streams in line with environmental concerns. One measure taken has been the implementation of zero liquid discharge (ZLD) policies to eliminate or at least minimise the liquid waste streams and if possible to recover the liquid (most often water) for reuse or safe disposal.

The technologies currently associated with ZLD include the treatment of the waste water by reverse osmosis, flocculation/coagulation, resin based separation technology, and distillation as well as combinations of these technologies. One of the main issues for implementing many ZLD technologies involves the added capital expenditure and increase in the plant footprint. In relation to capital expenditure, it will be appreciated that any ZLD system would require an additional energy source which in turn may impinge on the environmental benefits of including such systems into existing industrial plants.

The present invention seeks to overcome some of the shortcomings of the known ZLD systems and processes.

SUMMARY OF THE INVENTION

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

According to a first aspect of the present invention, there is provided a thermal distillation system comprising:
  a circuit for carrying a stream of treatable liquid from which liquid is to be extracted ("the liquid circuit");
  an input for supplying treatable liquid to the liquid circuit ("the liquid supply input");
  means for circulating the treatable liquid stream through the liquid circuit;
  heating means arranged on the liquid circuit for heating the liquid in the treatable liquid stream; and
  cooling means arranged on the liquid circuit for cooling the liquid in the treatable liquid stream,
  wherein the liquid circuit comprises a first section defined between an output from the heating means and an input to the cooling means, and a second section defined between an output from the cooling means and an input to the heating means,
  the system further comprising:
  a plurality of distillation stages, each stage including an evaporator arranged on the first section to vaporise liquid from the treatable liquid stream, a condenser arranged on the second section so as to be in heat exchange relationship with the treatable liquid stream in the second section to effect condensation in the condenser and heating of the treatable liquid stream in the second section, a circuit, on which the evaporator and condenser are arranged, for carrying a stream of carrier gas ("carrier circuit"), and an output for outputting from the condenser liquid extracted from the treatable liquid by the distillation stage; and
  means for circulating the carrier gas through each carrier circuit,
  wherein the stages are arranged such that their evaporators are disposed along the first section in a direction from the heating means to the cooling means and their condensers are disposed in corresponding order along the second section in a direction from the heating means to the cooling means.

The means for circulating the treatable liquid stream will ordinarily comprise at least one pump. Similarly, the means for circulating the carrier gas through each carrier circuit will ordinarily comprise at least one pump.

In an embodiment of the invention, the treatable liquid comprises water, and hence the liquid extracted is water. The water extracted may be potable or near potable in nature, suitable for irrigation or recycled into an industrial process.

Configuring the carrier circuits such that each stream of carrier gas in a stage is operationally independent of the stream of carrier gas in the/each other stage in the system greatly facilitates optimising the operating conditions of the system. The operational independence can be achieved by any of a number of physical topologies, such as physically independent loops and interconnected, nested loops.

The preferred embodiments of the invention relate to low-temperature thermal distillation systems. In particular, the preferred embodiments relate to systems in which the temperature of the liquid which is output from the heating means, does not exceed its boiling point. As an additionally preferred embodiment the system of the invention is a low-temperature thermal distillation system which operates at ambient pressure.

Preferably, the input is arranged on the circuit at a position which is such that the input liquid temperature is close to or the same as that of the treatable liquid in the liquid circuit at that position.

Preferably, the system comprises control means/at least one controller for varying the flow rate of the carrier gas in each carrier circuit according to the temperatures of liquid input into and output from each evaporator and/or the flow rate of liquid in the liquid stream. Preferably, the system further comprises regulating means/at least one regulator configured to detect at least one of said flow rate and said temperatures and to operate the control means/controller(s) to optimise the flow rate of the carrier gas in each carrier circuit.

Preferably, the system further comprises means for maintaining a flow rate of the liquid in the liquid circuit constant. In a preferred embodiment of the invention, the means for maintaining flow rate includes means for detecting liquid volume in the system, which may comprise at least one detector, and means, which may comprise at least one controller, for controlling a flow rate of liquid through the input according to signals from the means for detecting liquid volume. In this way, the flow rate of liquid in the liquid circuit may be maintained.

Optimisation of the system operation principally relies on controlling the values of six parameters in each stage, those parameters being treatable liquid temperature, carrier gas flow rate, carrier gas pressure, carrier gas volume, the ratio of treatable liquid flow rate to carrier gas flow rate, and treatable liquid load (or "water load" in the case of the treatable liquid comprising water), the latter being particularly critical. Water load is the volume of treatable water contacted with the carrier gas in a given evaporator at a given flow rate. The water load is the volume of water distributed in the evaporator in the case of the preferred embodiments, and more particularly the volume of water cascaded down a humidification pad in the evaporator.

Advantageously, the efficiency of the system according to a preferred embodiment can be maximised, in a simple manner, by maintaining the treatable liquid flow rate substantially constant whilst varying, if necessary, the flow rate of the carrier gas in each carrier circuit. Generally, the system upon optimisation would operate with a fixed flow rate of both carrier gas (flow rates independent in each carrier circuit) and treatable liquid, and the carrier gas flow rate could be varied in the event of a drop in evaporation rate resulting from a poor liquid-gas interaction, or a damaged, blocked or scaled evaporator fill pad. Also, preferably the system is configured to permit the velocity of the liquid in the liquid circuit passing through the evaporators to be sufficiently high to ensure the evaporation surfaces remain completely wetted so that the evaporation rate is maximised. Beneficially, both of these preferred features serve to minimise the accumulation of precipitated solids on the evaporation surfaces (i.e., minimise scaling and fouling), the advantage being that the system would not need to be taken off-line or that at least system downtime may be minimised, for repairs/cleaning due to scaling and fouling of the evaporators.

Preferably, the heating means and cooling means are operable and/or configured such that the temperatures of the treatable liquid output therefrom are controlled whereby the temperature of treatable liquid input into the evaporators and condensers respectively are maintained constant.

When the concentration of the contents in the liquid changes, as liquid is extracted from the liquid stream and/or liquid is supplied to the stream through the input (with the liquid stream flow rate being maintained constant), the carrier gas flow rate can be adjusted so that carrier gas leaving the evaporator in each circuit is maintained at substantially 100% relative humidity. Generally speaking, a system embodying the invention may reach "steady state" operating conditions with respect to temperature so that operation of the system can be substantially optimised simply by controlling the carrier gas flow rate, so maintaining the 100% relative humidity mentioned above, without a need also to control the heating/cooling output of the heating and/or cooling means.

In another embodiment, the system may be operated to extract liquid from the liquid circuit without operating the input to maintain the liquid volume in that circuit constant. In this way, the system may be operated in a batchwise manner. Operation of the system in this manner may have advantageous application in recovery of solids from the liquid (e.g., solids recovering and dewatering).

Preferably, the system is operable such that, in the or each pair of adjacent stages, the carrier gas flowing from the condenser to the evaporator in the stage which is first in a direction from the heating means to the cooling means is maintained at the same temperature as the carrier gas (and vapour therein) flowing from the evaporator to the condenser in the stage which is second in said direction. At this point, the system operation is optimised for thermal performance because the approach temperatures on either side of each evaporator are identical, and, similarly, the approach temperatures on either side of each condenser are identical. It can be shown that, because the liquid temperature at the junction of each evaporator pair is constant, the two coincident streams having identical temperature drops are also equal.

Preferably, the system further comprises means, for extracting, from the treatable liquid, extractable solids which result from extraction of liquid from the treatable liquid. Generally speaking, said extractable solids will be solids which precipitate out of the liquid stream as liquid is extracted therefrom. Preferably, the means for extracting solids comprises a plurality of solids separators, each separator being disposed on the treatable liquid circuit downstream of a respective evaporator to receive liquid therefrom. In particular embodiments of the invention, additional separators may be employed downstream of the cooling and/or heating means.

Preferably, the system is configured to circulate the carrier stream through each carrier circuit at ambient pressure. Advantageously, the system thus then requires no special sealing provisions to maintain the carrier gas at its operating pressure in the carrier circuits.

Preferably, the carrier gas comprises air.

Preferably, the number of stages is two. Whilst a system comprising more than two stages would in principle reduce the thermal energy requirements by more closely approximating the saturated air enthalpy curve, it has been found by the inventors that, given the attendant losses and higher operating and maintenance costs associated with a greater number of stages, that two stages is optimal.

In one embodiment of the invention, the system may be operable for the primary purpose of concentrating and/or precipitating the solids content dissolved or dispersed in the treatable liquid, rather than for obtaining liquid from the treatable liquid (e.g., solids recovery or dewatering). In such an embodiment, there may be means, which may comprise a venting apparatus, provided for venting the carrier gas, downstream from the condenser, such that a large proportion of the liquid carried (as for example, water vapour) in the carrier gas is released to the atmosphere, and means for supplying fresh carrier gas to the carrier circuits.

In one embodiment of the invention, the system further includes means, which may comprise at least one input, for supplying treatment fluid into the treatable liquid and/or carrier gas to control the chemistry thereof. The treatment liquid supplying means may be arranged to supply treatment liquid to the liquid stream. In one embodiment, the treatment fluid is supplied to the liquid stream at one or more of the evaporators, in the form of a spray or mist in an evaporation chamber of the or each evaporator.

Treatment fluid may be supplied for one or more of the following purposes:
- treatment of liquids within the system to induce or prevent precipitation of specific chemicals;
- treatment of liquids for the purposes of chemically altering ("value-adding") or removing potentially hazard chemicals, or chemicals likely to produce corrosion, scaling and/or fouling;
- treatments to enable processing of waste waters with moderate organic loadings; and
- facilitating or improving operational efficiency of the process (the treatment fluid, to this end, possibly comprising a cleaning liquid, dispersant and/or antiscalant).

Employment of treatment fluid may, for example, increase or decrease precipitation or rates thereof, have the effect of altering physical properties of the treatable liquid where it interfaces with the carrier gas (to this end possibly comprising a surfactant or anti-foaming agent), and/or adjust the chemical behaviour of the treatable liquid to reduce or minimise its aggressiveness upon components of the system (e.g. altering its pH or reducing its corrosiveness).

Embodiments which employ treatment fluid may be of advantageous application in recovery of solids from the liquid (e.g. solids recovering and dewatering) and controlling composition of the treatable liquid and carrier gas.

In a preferred embodiment of the invention, the systems may be operable such that the treatment fluid is input to the liquid circuit after one or more of the evaporators and before a downstream separator.

The system employing treatment fluid is preferably operable such that interaction between the treatment fluid and treatable liquid can be controllably adjusted.

Exemplary applications of treatment liquid include the use of slaked lime ($Ca(OH)_2$) to generate magnesium hydroxide ($Mg(OH)_2$) and soda ash ($Na_2CO_3$) to precipitate calcium carbonate ($CaCO_3$) from brine streams, as well as applications for improving the quality and value of other salt fractions.

In preferred embodiments of the invention, the system forms part of an extraction system comprising a plurality of thermal distillation systems each embodying the invention.

According to a second aspect of the present invention, there is provided an extraction system, including:
- a first apparatus comprising at least one system as defined above, wherein the input of the or each system is arranged for receipt of a treatable liquid comprising a plurality of extractable constituents, the first apparatus being operable to extract from the treatable liquid at least one constituent in solid form; and
- a second apparatus comprising at least one system according to any one of the preceding claims ("further system"), wherein the input of the or each further system is arranged for receipt of liquid from which the at least one constituent has been extracted by the first apparatus, the second apparatus being operable to extract from the liquid at least one further constituent in solid form.

According to a third aspect of the present invention, there is provided a process for extracting a liquid from a treatable liquid, comprising the steps of:
- circulating a stream of treatable liquid ("the liquid stream") in a circuit ("the liquid circuit");
- heating the liquid in the liquid stream at a position on the liquid circuit ("the heating position");
- circulating, in respective circuits ("carrier gas circuits"), respective streams of carrier gas ("carrier gas streams"), and contacting, at successive positions along the liquid circuit downstream of the heating position ("evaporation positions"), the carrier gas in respective carrier gas streams, in order from a first carrier gas stream to a final carrier gas stream, with the treatable liquid to effect evaporation of liquid from the treatable liquid, thereby forming vapour which is carried by the carrier gas in the carrier circuits and effecting cooling of the treatable liquid in the circuit at the evaporation positions;
- cooling the liquid in the liquid stream at a position downstream of the evaporation positions ("the cooling position");
- effecting, at successive positions ("condensation positions") along the circuit downstream of the cooling position and upstream of the heating position, heat exchange between the liquid in the liquid stream and vapour carried in respective carrier gas streams, in order from the final carrier gas stream to the first carrier gas stream, to effect condensation of liquid from the carrier gas stream and heating of the treatable liquid in the circuit upstream of the heating position; and
- removing the condensed liquid.

Preferably, in the or each pair of adjacent carrier gas streams, the temperature of the carrier gas flowing from the condensation position to the evaporation position in the carrier gas stream which is first in the direction from the heating position to the cooling position and the temperature of the carrier gas flowing from the evaporation position to the condensation position in the carrier gas stream which is second in said direction are maintained equal.

Preferably, the process includes controlling the flow rate of the carrier gas in each carrier circuit to maintain the carrier gas output from the evaporation positions at 100% relative humidity.

In a preferred embodiment of the invention, the temperature of the liquid output from the heating means does not exceed its boiling point and the temperature of the liquid output from the cooling means is not below its freezing point.

Preferably, the process further includes maintaining a flow rate of the treatable liquid stream constant.

In one embodiment of the invention, the process further includes maintaining a supply of treatable liquid to the liquid circuit. The supply may be maintained at a constant level. In another embodiment of the invention, the process involves extracting the liquid without maintaining such a supply, whereby the extraction is carried out in a batchwise manner.

The latter embodiment may have advantageous application in recovery of solids from the liquid (e.g., solids dewatering).

Preferably, the process further comprises separating from the liquid circuit solids which precipitate out of the liquid stream as liquid is extracted therefrom. Preferably, the process comprises separating, from the liquid in the liquid circuit, solids at respective positions along the liquid circuit downstream of the evaporation positions, thereby separating solids from the liquid output from each evaporation position.

Preferably, the process comprises circulating the carrier streams at ambient pressure. Advantageously, the process thus then requires no special sealing provisions to maintain the carrier gas at its operating pressure in the carrier circuits.

The carrier gas used may comprise any gas that is capable of receiving liquid vapour from the treatable liquid.

Preferably, the carrier gas is air.

Preferably, the number of carrier circuits is two.

In a preferred embodiment of the invention, the carrier streams are circulated at ambient pressure.

According to a fourth aspect of the present invention, there is provided a process for extracting a liquid from a treatable liquid stream, comprising the steps of:
  (i) circulating a stream of treatable liquid ("the liquid stream") in a circuit ("the liquid circuit");
  (ii) heating the liquid in the liquid stream at a position on the liquid circuit ("the heating position");
  (iii) circulating, in respective circuits ("carrier gas circuits"), respective streams of carrier gas ("carrier gas streams"), and contacting, at successive positions along the liquid circuit downstream of the heating position ("evaporation positions"), the carrier gas in respective carrier gas streams, in order from a first carrier gas stream to a final carrier gas stream, with the treatable liquid to effect evaporation of liquid from the treatable liquid, thereby forming vapour which is carried by the carrier gas in the carrier circuits and effecting cooling of the treatable liquid in the circuit at the evaporation positions;
  (iv) cooling the liquid in the liquid stream at a position downstream of the evaporation positions ("the cooling position"); and
  (v) effecting, at successive positions ("condensation positions") along the circuit downstream of the cooling position and upstream of the heating position, heat exchange between the liquid in the liquid stream and vapour carried in respective carrier gas streams, in order from the final carrier gas stream to the first carrier gas stream, to effect condensation of liquid from the carrier gas stream and heating of the treatable liquid in the circuit upstream of the heating position; and
  (vi) removing the condensed liquid.

In a preferred embodiment of the invention, step (i) comprises heating the treatable liquid to a temperature not exceeding its boiling point.

In a preferred embodiment of the invention, step (iv) comprises cooling the treatable liquid to a temperature not below its freezing point.

In a preferred embodiment, where the treatable liquid stream is a treatable water stream (e.g., waste water stream), step (i) comprises heating the treatable liquid to a temperature not exceeding 80° C. and step (iv) comprises cooling the treatable liquid to a temperature not below its freezing point. More preferably, step (i) comprises heating to a temperature not exceeding 80° C. and step (iv) comprises cooling to a temperature not below 15° C.

In a preferred embodiment of the invention, the treatable liquid stream comprises treatable water, step (i) comprises heating the treatable liquid to a temperature not exceeding 80° C. and step (iv) comprises cooling the treatable liquid to a temperature not below 15° C.

In a preferred embodiment of the invention solids are separated from the treatable liquid stream downstream of at least one of the evaporators.

In a preferred embodiment, the process includes solids separation effected after the liquid has been transported through each of the evaporators. Accordingly, if the process employs the use of two evaporators, then the process will also employ two separation steps—one for each evaporator. However, for certain applications, additional separators may be employed downstream of the cooling and/or heating means.

According to a fifth aspect of the present invention, there is provided the use of a system or process as described above to concentrate and/or precipitate solids dissolved or dispersed in the treatable liquid.

BRIEF DESCRIPTION OF THE DRAWINGS

The present invention will now be described, by way of non-limiting example only, with reference to the accompanying drawings, in which:

FIG. 2B contains tables listing data associated with the implementation shown in FIG. 2A;

FIG. 3 is a key defining the various symbols used in FIGS. 4 to 14;

GENERAL IMPLEMENTATIONS OF THE INVENTION

Figure 1:
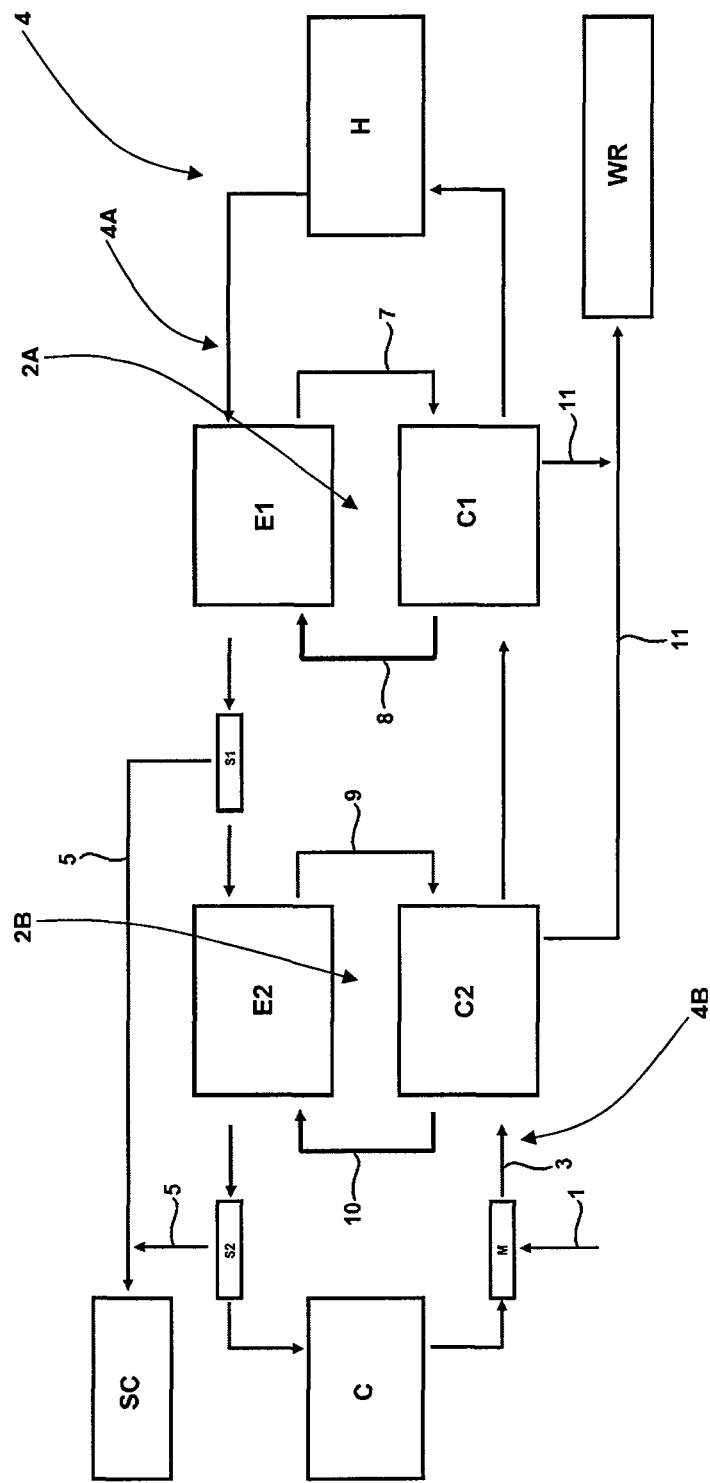
FIG. 1 is a flow diagram showing the general topology of a thermal distillation system according to a preferred embodiment of the present invention.

The term "system" as used herein may refer to an "apparatus".

It will be understood that the term "treatable liquid" as used herein refers to any liquid which necessitates treatment by the system of the present invention and includes mixtures of liquids together with liquids with dissolved or dispersed solids. Typically the treatable liquid will be a liquid which has been used in an industrial process. Such liquid may be referred to as waste liquid or effluent, and is most often aqueous in nature (e.g., waste water). It will be appreciated however that not all liquid streams which emanate from an industrial process are waste streams as some liquid streams may contain commercially valuable salts or minerals. As such the term "treatable liquid" is meant to encompass liquid streams which are waste streams and hence require treatment by the present system to eliminate or at least minimise potential environmental hazards, or liquid streams which comprise potentially commercially valuable materials and require treatment by the present system to recover such materials. In both scenarios the extracted liquid may be recovered and either re-used or used in other applications which are discussed below in more detail.

The term "treatment fluid" as used herein refers to any liquid or gas introduced into the system embodying the invention to control the internal chemical environment (i.e. circulating treatable liquid and/or carrier gas).

Thus, the present invention may be employed to treat liquid derived from a number of different sources. In a preferred embodiment the treatable liquid may be an aqueous saline solution (such as brackish water, sea water, industrial based salt solutions, etc). The treatable liquid may also be sourced from the agricultural industry (e.g., surface runoff containing soil, nitrogen, phosphorous and pesticides), iron and steel industries (e.g., cooling water contaminated with "soluble metal by-products" e.g. zinc and iron chloride), mines and quarries (e.g., a slurry comprising rock/mineral particles in water), the food industry (e.g., water with concentrations of biochemical oxygen demand and suspended solids), the complex organic chemicals industry (e.g., cooling water contaminated with petrochemicals, water treatment facilities (e.g., water rich in hardness ions), the nuclear industry (e.g., cooling water contaminated with radium and its decay products) and the like.

The above systems and processes can operate using the following components and methodologies:

Heating Means

The liquid stream is partially heated as it flows through the plurality of condensers disposed on the second section of the liquid circuit. Within each condenser, heat is transferred from the carrier gas stream to the liquid stream, whereby the carrier gas in the carrier gas stream is cooled and the liquid in the liquid stream is heated. However, before the liquid stream exiting the final condenser disposed on the second section of the liquid circuit can enter the first evaporator disposed on the first section of the liquid circuit, the liquid stream must undergo further heating in order to maintain the necessary thermal driving force across the distillation system (preferably an overall temperature difference of at least 15° C. between the heating and cooling sources). Any heating means suitable for heating the liquid stream may be used for this purpose.

The heating means in preferred embodiments of the invention comprises low grade heat sources, such as low temperature waste heat sources and renewable heat sources. Examples of low temperature waste heat sources include, but are not limited to, steam, diesel, coal, petroleum coke, refuse and nuclear energy. Such heat sources may derive from or comprise fired boilers, gasifiers, heaters, furnaces, gas turbines, steam turbines, internal combustion engines etc. used in utility industries (e.g., power), heavy industries (e.g., steel, aluminium, copper, cement, pulp and paper, glass, soda ash, waste recycling refineries (e.g., petroleum), gasification plants, chemical plants (e.g., chlor-alkali, vinyl), incinerators, etc. Examples of renewable heat sources include, but are not limited to, solar energy, geothermal energy, biomass and syngas.

In the above embodiments it will be appreciated that the present invention can be driven by low-grade heat sources and in this regard may involve the capture and utilisation of heated greenhouse gases such as $CO_2$ or biohazardous gases. Thus, in such an embodiment the present system provides certain environmental advantages and also economical advantages especially in the context of the foreseen introduction of international carbon trading schemes.

Typically, the liquid stream is heated by means of indirect contact with a heating stream in a heat exchanger. The heating stream may be the low grade heat source itself (e.g., steam vented from a steam turbine used in a pulp and paper plant) or the heating stream may be a fluid that has been pre-heated by the low grade heat source (e.g., water pre-heated in a solar thermal collector system). The heat exchanger may be selected from the group comprising but not limited to shell-and-tube heat exchangers, plate heat exchangers, tube-and-fin heat exchangers and waste heat recovery units.

Cooling Means

The liquid stream is partially cooled as it flows through the plurality of evaporators disposed on the first section of the liquid circuit. Within each evaporator, heat is transferred from the liquid stream to the carrier gas stream, whereby the liquid in the liquid stream is cooled and gas/vapour in the carrier gas stream is heated. However, before the liquid stream exiting the final evaporator disposed on the first section of the liquid circuit can enter the first condenser disposed on the second section of the liquid circuit, the liquid stream must undergo further cooling in order to maintain the necessary thermal driving force across the distillation system. Any means suitable for cooling the liquid stream may be used for this purpose.

Preferably, the liquid stream is cooled by cooling means/ one or more coolers selected from the group comprising but not limited to chillers (e.g., electric, absorption, hybrid), ice slurry technology, subterranean cooling, sea water cooling and deep lake cooling.

Evaporators

The term "evaporator" as used herein refers to any mechanical apparatus which is able to effect transformation of a liquid into its corresponding gaseous or vapour form. Humidifiers represent one form of evaporator and are often associated with the formation of water vapour from liquid water.

Within each evaporator disposed on the first section of the liquid circuit, liquid is vaporised from the liquid stream into the carrier gas stream, thereby concentrating the liquid stream and humidifying the carrier gas stream, preferably to saturation point (100% relative humidity).

Types of evaporators that may be used in accordance with the present invention include, but are not limited to, natural circulation evaporators, forced circulation evaporators, falling film evaporators, rising film evaporators and plate evaporators.

Condensers

The term "condenser" as used herein refers to any mechanical apparatus which is able to effect transformation of a gas or vapour to its corresponding liquid form. Dehumidifiers represent one form of condenser and are often associated with the formation of liquid water from water vapour.

Within each condenser disposed on the second section of the liquid circuit, liquid vapour is condensed from the carrier gas stream, thereby dehumidifying the carrier gas stream and producing a stream of distilled liquid that is removed from the process.

The condensers used in the preferred embodiments of the invention are typically heat exchangers and in particular tube-and-fin heat exchangers or condensing coils. The liquid stream flows inside the heat exchanger tube(s), and the carrier gas stream flows on the outer fins, so that the liquid condenses on the outer fins. Similarly, where the condensers are shell-and-tube heat exchangers, the liquid stream and the carrier gas stream generally flow on the tube side and the shell side, respectively, so that the distilled liquid condenses on the outside of the tubes.

Separators

The removal of distilled liquid from the liquid stream through vaporisation concentrates the treatable liquid stream. Therefore, immediately downstream of each evaporator disposed on the first section of the liquid circuit, there is provided a separator to remove a portion of the solids from the liquid stream and hence facilitate the flow of the liquid stream through the liquid circuit.

Typically, crystallisation and sedimentation techniques are employed to enable separation and recovery of solids (as a sludge, slurry or cake) from the treatable liquid stream.

Other Components

The treatable liquid can be continually supplied to the liquid circuit (to replenish the liquid extracted and solids recovered from the liquid stream), by any appropriate input means.

In the preferred embodiments of the invention, the liquid and carrier gas streams circulate through the liquid and carrier gas circuits, respectively, via a network of piping and instrumentation (valves, pumps, fans etc.) that is subject to a control system which continually monitors and regulates the various process parameters (temperature, pressure, flow, level, humidity etc.).

Further Optional Processing which May be Integrated into the Present Systems and Processes Pre-Processing It will therefore be appreciated that the treatable liquid (e.g., waste water) may need to be processed before entering the present system or process. Pre-processing of the treatable liquid may include removal of solids by filtration. This is particularly preferred for insoluble particles greater than or equal to 40 μm in size. Filtration may be achieved using microfiltration (MF) and ultrafiltration (UF) devices known in the art. Where the treatable liquid is water derived from a natural source (e.g., sea water or river water), the pre-processing step may also preferably include the removal of dissolved organic carbon (DOC) and volatile organic compounds (VOC). While DOC and VOC typically derive from natural organic matter, it will be appreciated that VOC may derive from the treatable liquid streams of many industrial processes. The removal of DOC can be achieved by nanofiltration (NF) and reverse osmosis (RO) or via the use of resin-based ion-exchange and size exclusion chromatography. Other removal methods include the use of chemical flocculants and/or coagulants.

Integrated Processing

As discussed previously, systems according to particular embodiments of the present invention may be operable to supply a treatment liquid for the purposes of controlling the chemical environment of either or both the treatable liquid and carrier gas. In embodiments used to treat particular treatable liquids, a treatment fluid may be introduced into the treatable liquid stream, for the purposes of regulating and controlling the composition of treatable liquid and the formation of bi-products derived from the treatable liquid.

These embodiments may include an integrated system for controllably supplying the treatment fluid and/or include a chemical interface arrangement. Preferably, the treatment liquid is introduced into the treatable liquid circuit of the system immediately downstream of each, or a selection, of the evaporators and upstream of respective separators.

Preferably, introduction of the treatment fluid comprises controlled dispersion of a treatment liquid into the treatable liquid stream.

Embodiments of the invention which employ treatment fluids are preferably configured to control automatically, or to enable manual control of, treatment liquid and carrier gas volume and/or temperature, both of which may be caused to vary as a result of chemical reactions involving the treatment liquid, whereby optimal or preferred conditions (under which the system operated prior to supply of the treatment fluid) may be maintained or restored. In this regard, the system embodying the invention may include a means, which may comprise at least one controller, for controlling carrier gas pressure/volume by way of controlled venting or controlled intake of humidified carrier gas into the carrier gas circuits, the intaken carrier gas, in the case of it being air, being preferably humidified.

Post-Processing

Further processing of the solids recovered from the liquid stream may be required. Such further processing may include solids dewatering (e.g., using evaporators) and/or purification. Dewatering may be implemented, for example, where the solids are of little commercial value and so are to be disposed of in landfill or where the solids are non-toxic and of nutritional value and so are to be used in animal feed supplements or fertilisers. The purification techniques which can be employed will also depend upon the value, toxicity and chemical nature of the solids recovered. Examples include crystallisation, liquid/liquid extraction, magnetic separation, filtration, gravity sedimentation, centrifugal sedimentation etc. Such purification techniques may involve the use of magnetic drum separators, rotary drum filters, hydrocyclones, thickeners, clarifiers, settlers, centrifuges etc. The types of solids which may be separated or recovered, and optionally purified via the present invention include salts (e.g., Mg, Ca, Li, Na, K, Ag etc. salts), minerals, metals (e.g., Cd, U, Hg, As etc.).

Similarly, further processing of the distilled liquid (e.g., water) extracted from the treatable liquid stream may be required. The type of post-processing to which the extracted liquid is subjected will depend upon the liquid itself and its ultimate application. For instance, the extracted liquid may be water that is intended to be used as potable water. Additionally, the post-processing may include disinfection conducted according to government requirements of water standards. Typically, disinfection techniques involve the use of chemical disinfectants such as chloride, chloramines, chlorine dioxide, ozone, potassium permanganate, peroxone etc. Subjecting the distilled or extracted water to UV radiation may also achieve an appropriate level of disinfection. Thus, the present invention may operate in conjunction with other unit processes such as ozonation and water treatment using granular activated carbon (GAC). It will be appreciated, however, that the present invention provides a major benefit in the production of potable or reclaimed water because it does not rely on membrane technology (NF, MF, UF or RO) and so it can treat saline and brackish water with high total dissolved solids (TDS) in excess of 300,000 ppm salt. The maximum ppm levels are only limited by the saturation point of the contained salts. Where the extracted water is to be recycled or re-used in an industrial process, the post-processing may involve the addition of chemicals such as surfactants, frothing agents, emulsifiers, etc. If the extracted water is to be disposed of by being discharged into a water stream (e.g., a river or sea), the post-processing may include online chemical analysis of the extracted water to ensure that it meets safe disposal criteria.

Additional Advantages

The various features described above confer a number of important advantages over conventional liquid treatment technologies. In particular, thermal distillation system and processes embodying the present invention can offer treatment of multiple input streams, modular and scalable design, use of low grade waste heat sources, high thermal efficiency, low fouling, high liquid recovery and solids recovery via ZLD with the potential for selective solids harvesting (SSH). Another key advantage of preferred embodiments of the present invention resides in the flexibility of being able to operate the system/process as an independent liquid treatment unit, or alternatively, as an associated liquid treatment unit that is connected to one or more existing process units (i.e. can be retro-fitted). The latter arrangement is particularly convenient when heating in the system/process is achieved by means of a low grade waste heat stream generated in a different process unit within the same plant.

DETAILED DESCRIPTION OF THE PREFERRED EMBODIMENTS

The thermal distillation system depicted in FIG. 1 comprises an apparatus 50 which includes first (2A) and second (2B) stages, the first stage 2A comprising an evaporator E1, a condenser C1 and a carrier gas circuit on which the evaporator E1 and condenser C1 are arranged, and the second stage 2B comprising an evaporator E2, condenser C2, and a carrier gas circuit on which evaporator E2 and condenser C2 are arranged, and further includes a heating means (H), a cooling means (C), an input, which in this embodiment is defined by a liquid stream mixer (M), which supplies a feed of waste water, solids separators (S1 and S2), a solids collector (SC) and a water receptacle (WR). A waste water feed (1) enters the liquid stream 3 via mixer M, the waste water thence flowing in a direction as indicated by the arrows. The liquid stream 3 flows through the condensers (C2 followed by C1). The liquid stream (3) then flows through heating means H where it is heated before entering the evaporators (E1 followed by E2), which are immediately followed by, i.e. immediately downstream of which are, separators S1 and S2 respectively. Solids recovered from the separators S1 and S2 are carried to solids collector SC via a line 5. Closed loop carrier gas streams (a first of which comprises stream sections 7 and 8 and a second of which comprises stream sections 9 and 10) extract water vapour from the liquid stream (3) within evaporators E1 and E2, and then transport the water vapour to condensers C1 and C2, respectively. The liquid stream 3 then flows through cooling means C where it is cooled before re-entering the condensers (C2 followed by C1). Water recovered from the condensers (C2 followed by C1) is sent to receptacle WR via line 11.

The liquid stream 3 flows through a circuit 4 which comprises a first section 4A defined between an output from the heating means and an input to the cooling means and a second section 4B defined between an output from the cooling means and an input to the heating means. Evaporators E1 and E2 are arranged on the first section 4A and condensers C1 and C2 are arranged on the second section 4B. The stages 2A and 2B are arranged such that their evaporators E1 and E2 respectively are disposed along the first section 4A in a direction from the heating means H to the cooling means C in the same order as are their condensers C1 and C2 along the second section 4B in a direction from the heating means H to the cooling means C. In other words, the stages 2A and 2B are arranged such that their evaporators E1 and E2 are disposed along the first section 4A in a direction from the heating means H to the cooling means C and their condensers C1 and C2 are disposed in corresponding order along the second section 4B in a direction from the heating means H to the cooling means C.

It will be appreciated that the waste water input may be disposed elsewhere on the circuit, its position being selected so as best to suit the input water temperature and chemistry and avoid disadvantageous precipitation.

Figure 2A:
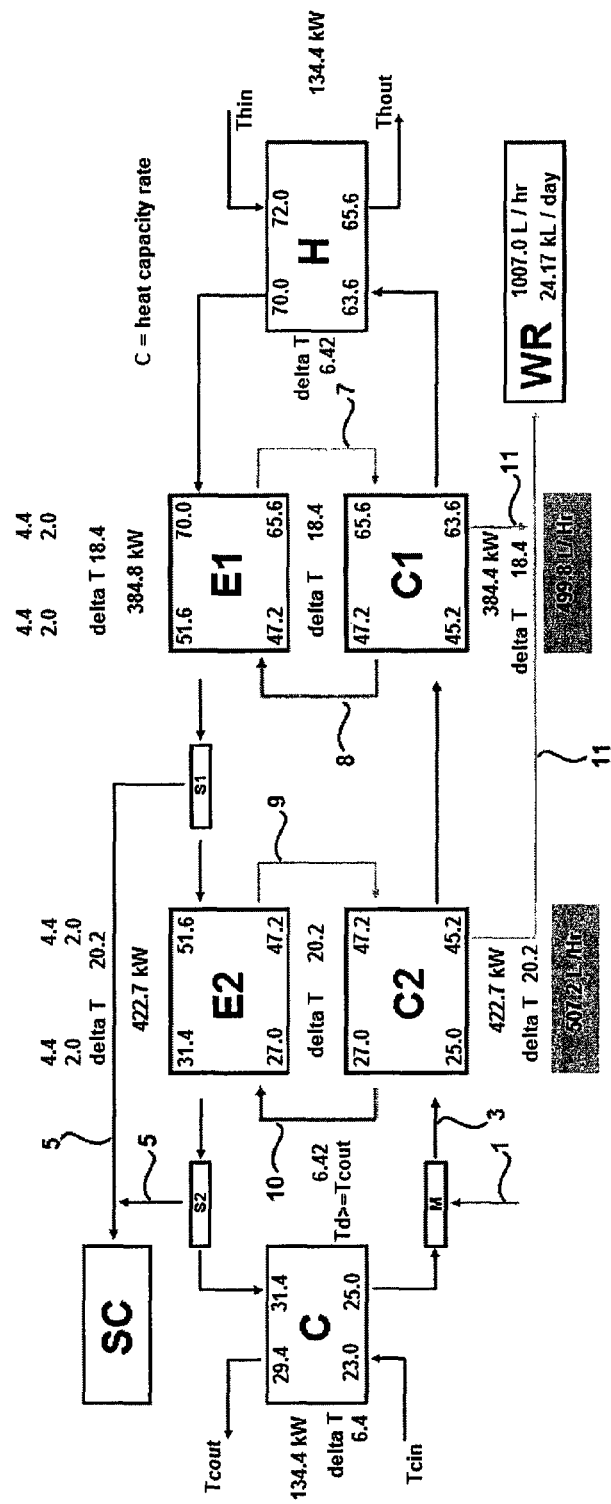
FIG. 2A is a flow diagram showing an exemplary operating implementation of the topology shown in FIG. 1 in accordance with a preferred embodiment of the present invention.
Figure 4:
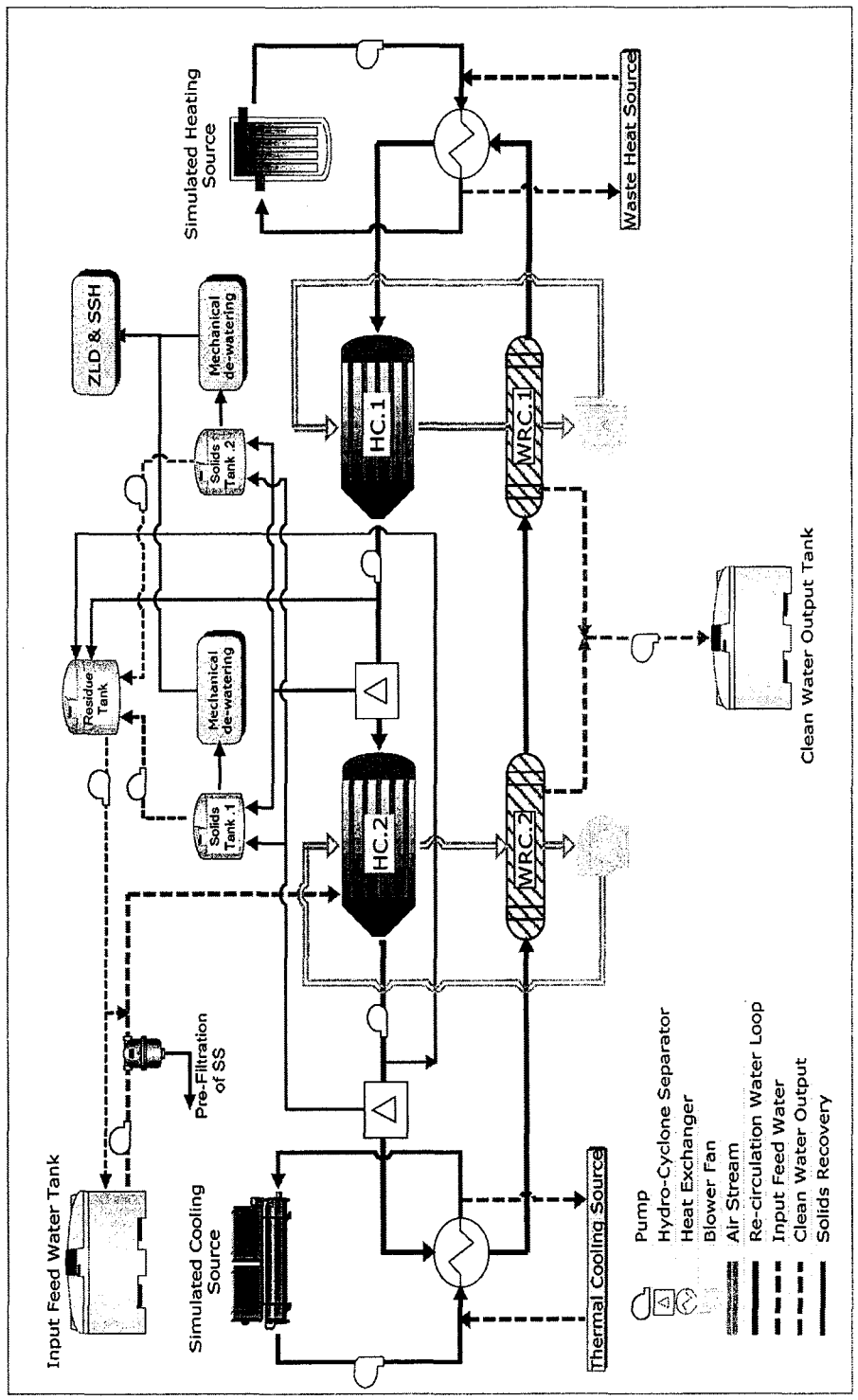
FIG. 4 is a process flow diagram showing a two-stage distillation system according to a preferred embodiment of the present invention.
Figure 5:
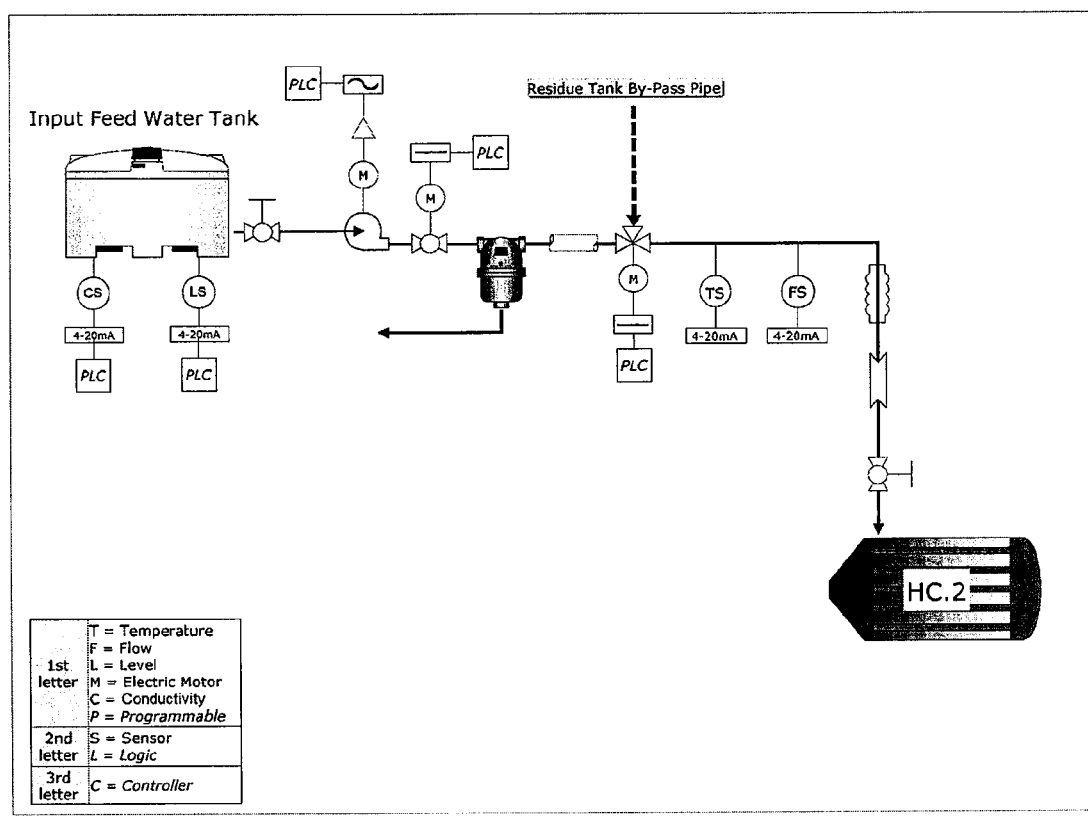
FIG. 5 is a process and instrumentation diagram of a water input according to a preferred embodiment of the present invention.
Figure 6:
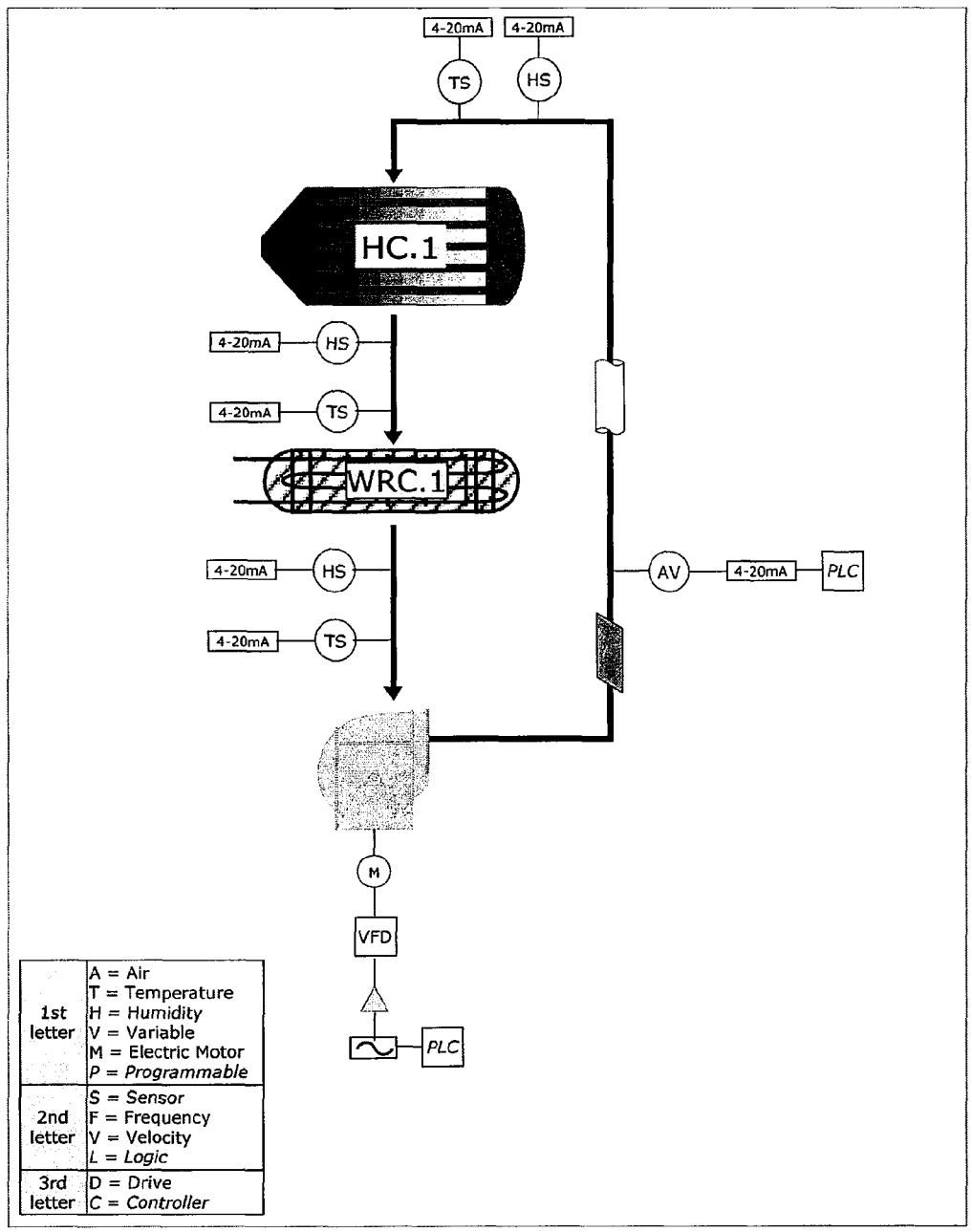
FIG. 6 is a process and instrumentation diagram of a first stage air loop according to a preferred embodiment of the present invention.
Figure 7:
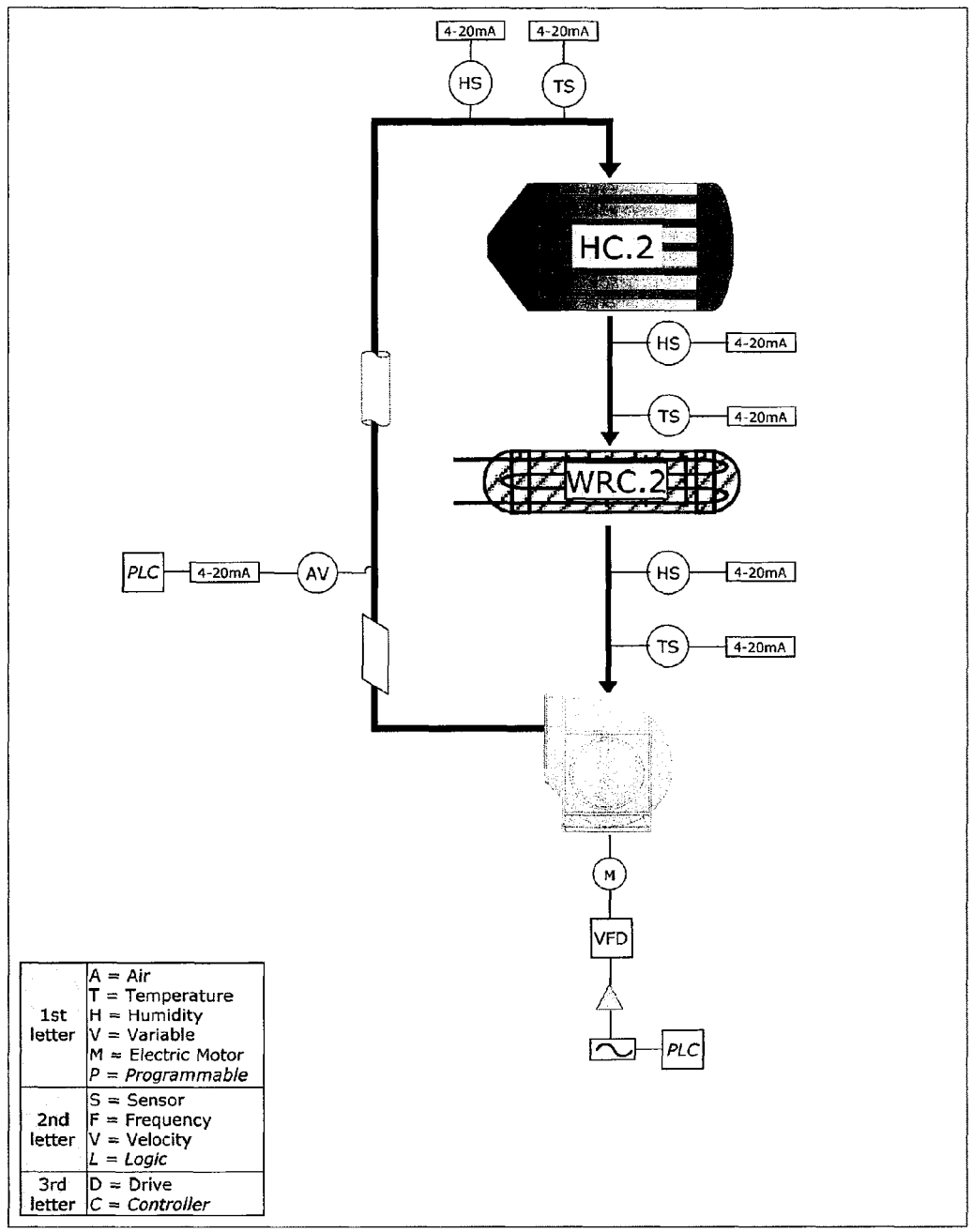
FIG. 7 is a process and instrumentation diagram of a second stage air loop according to a preferred embodiment of the present invention.
Figure 8:
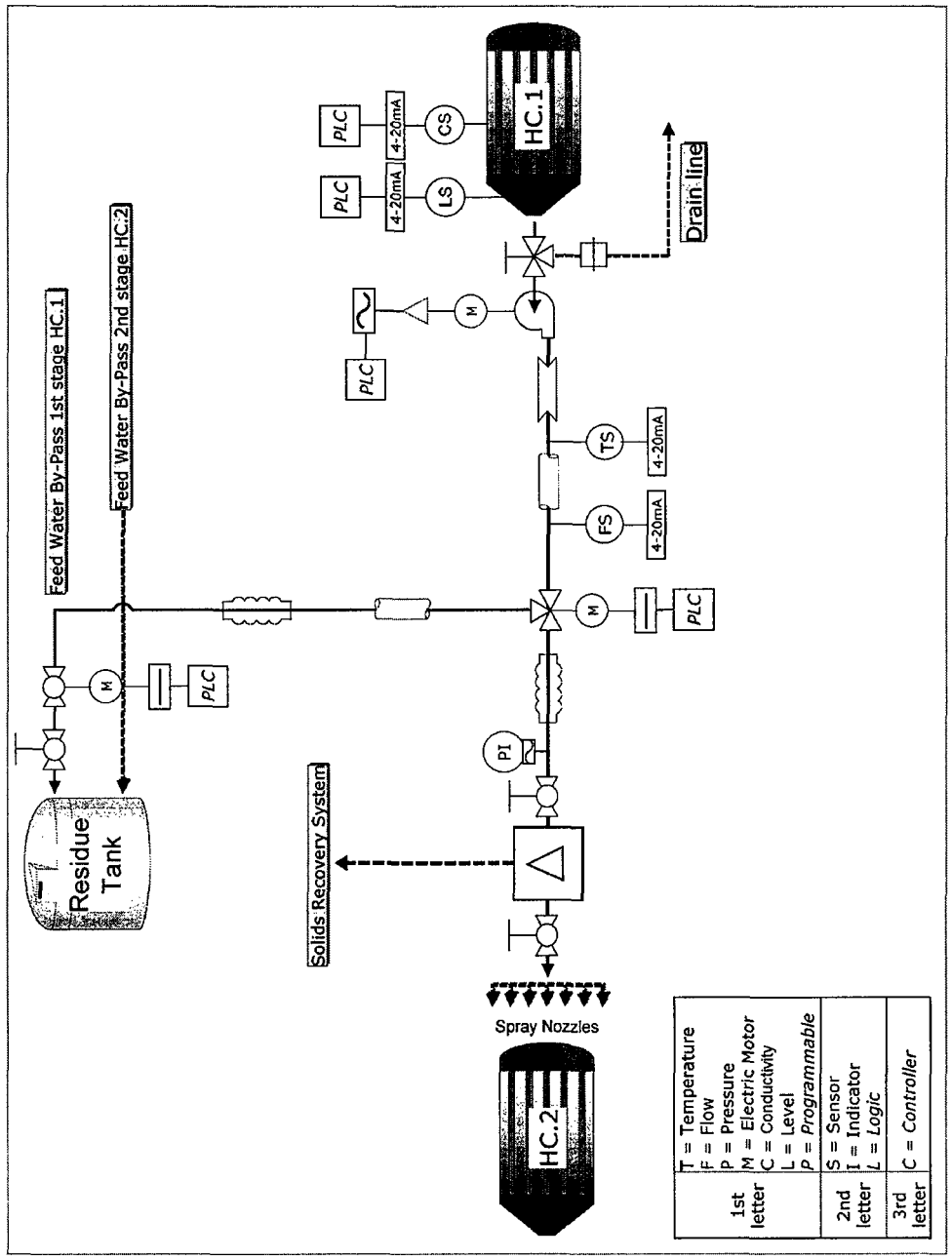
FIG. 8 is a process and instrumentation diagram of a first stage re-circulation loop according to a preferred embodiment of the present invention.
Figure 9A:
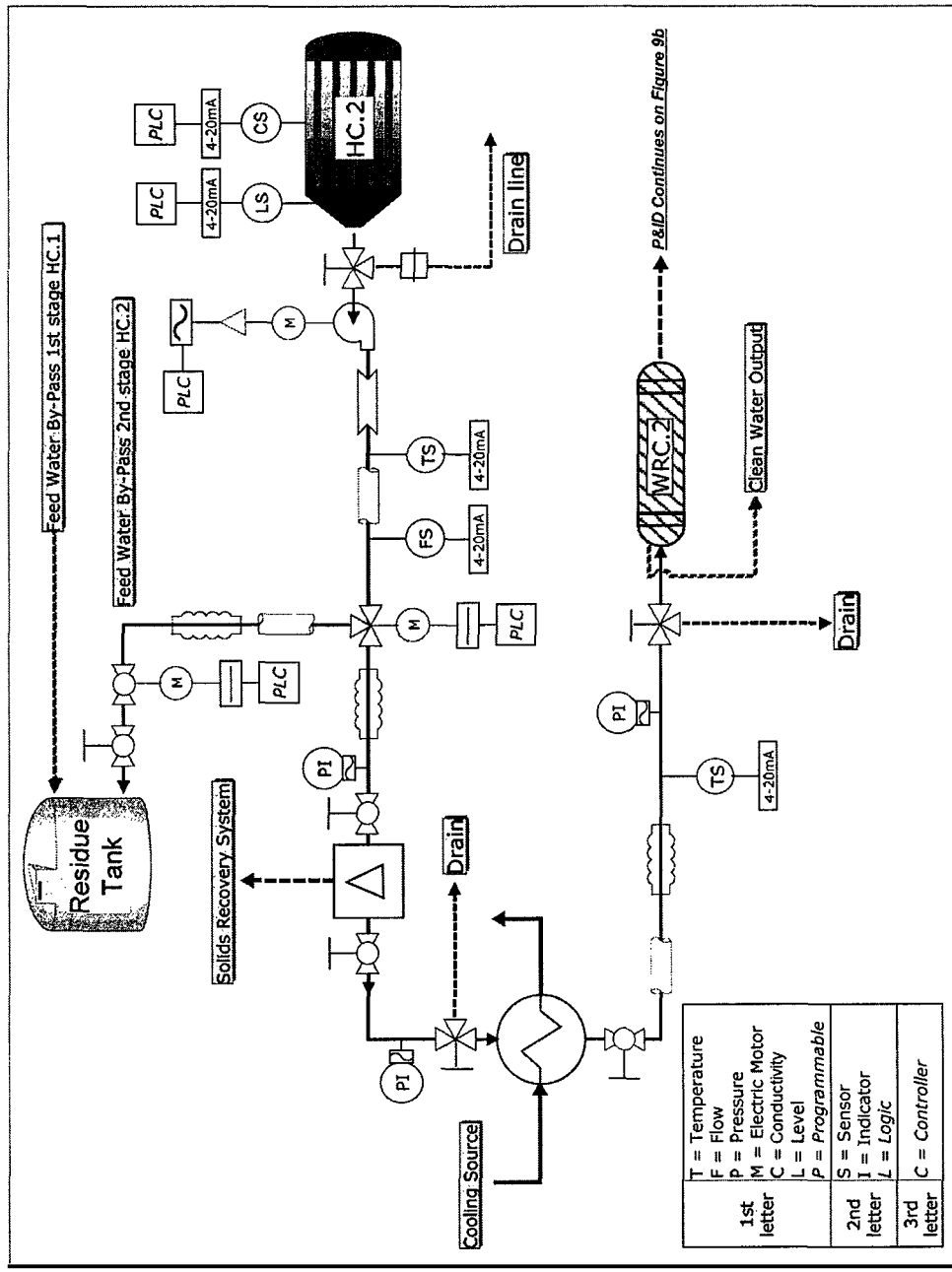
FIGS. 9a and 9b are process and instrumentation diagrams of a second stage re-circulation loop according to a preferred embodiment of the present invention.
Figure 9B:
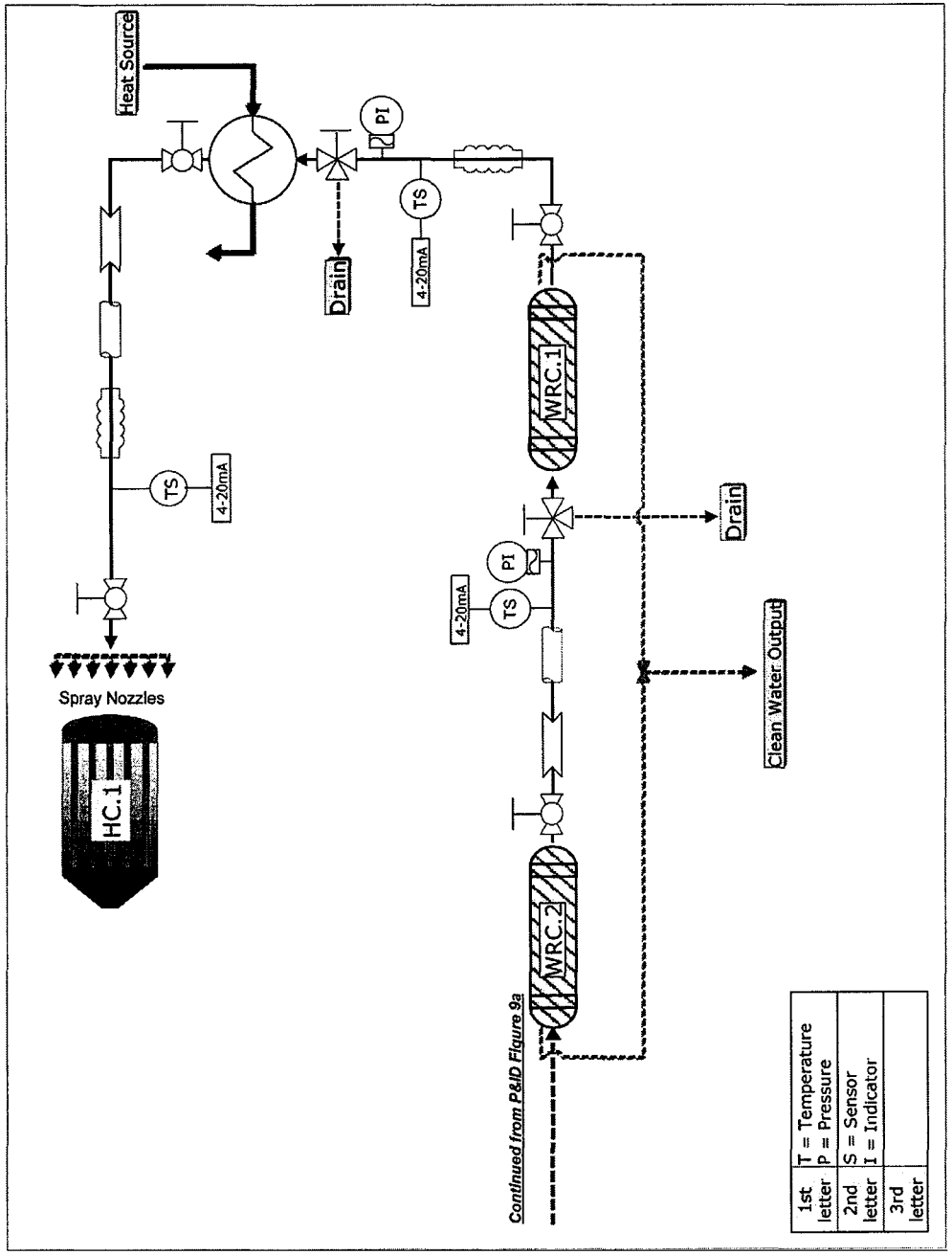
Figure 10:
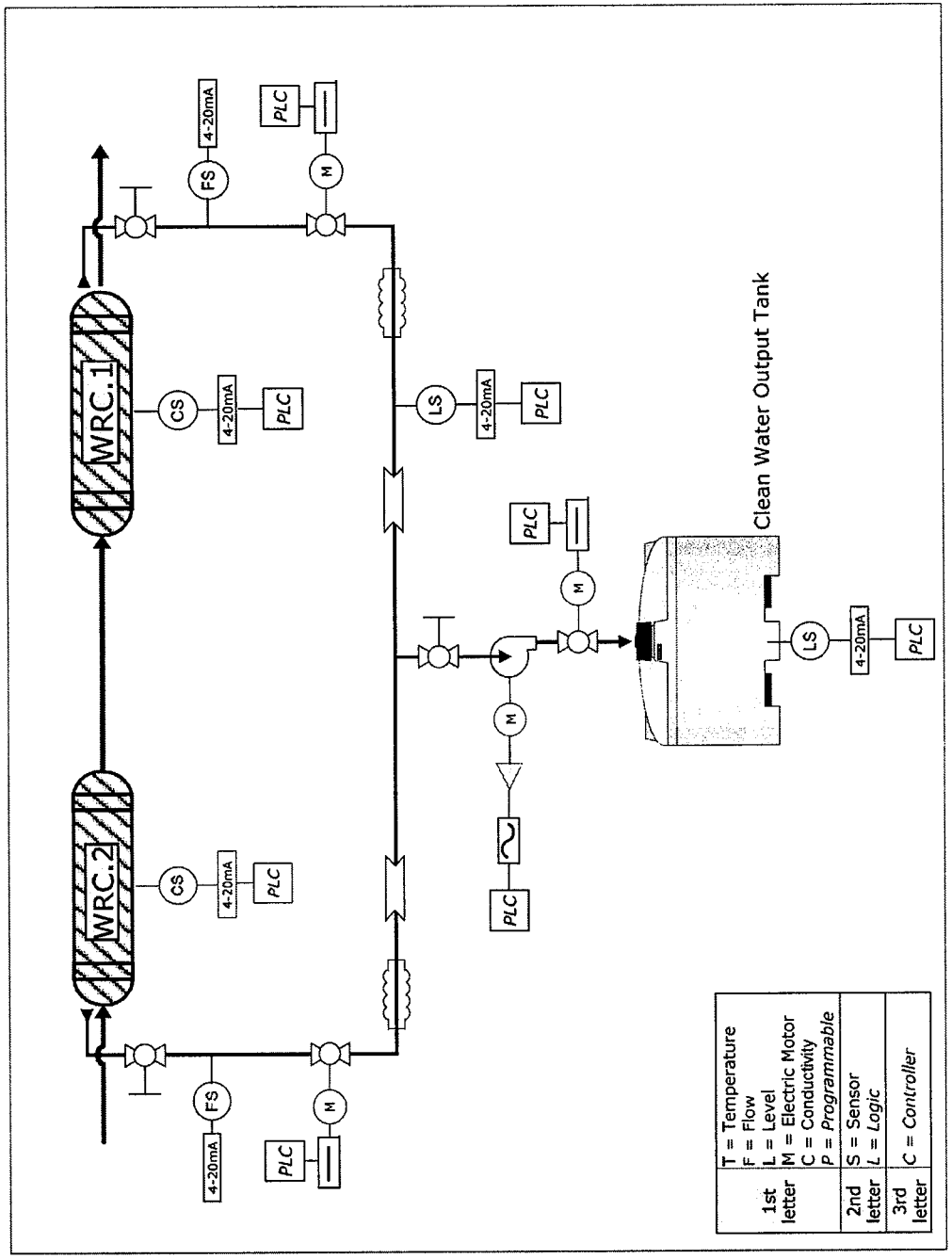
FIG. 10 is a process and instrumentation diagram of a water output according to a preferred embodiment of the present invention.
Figure 11:
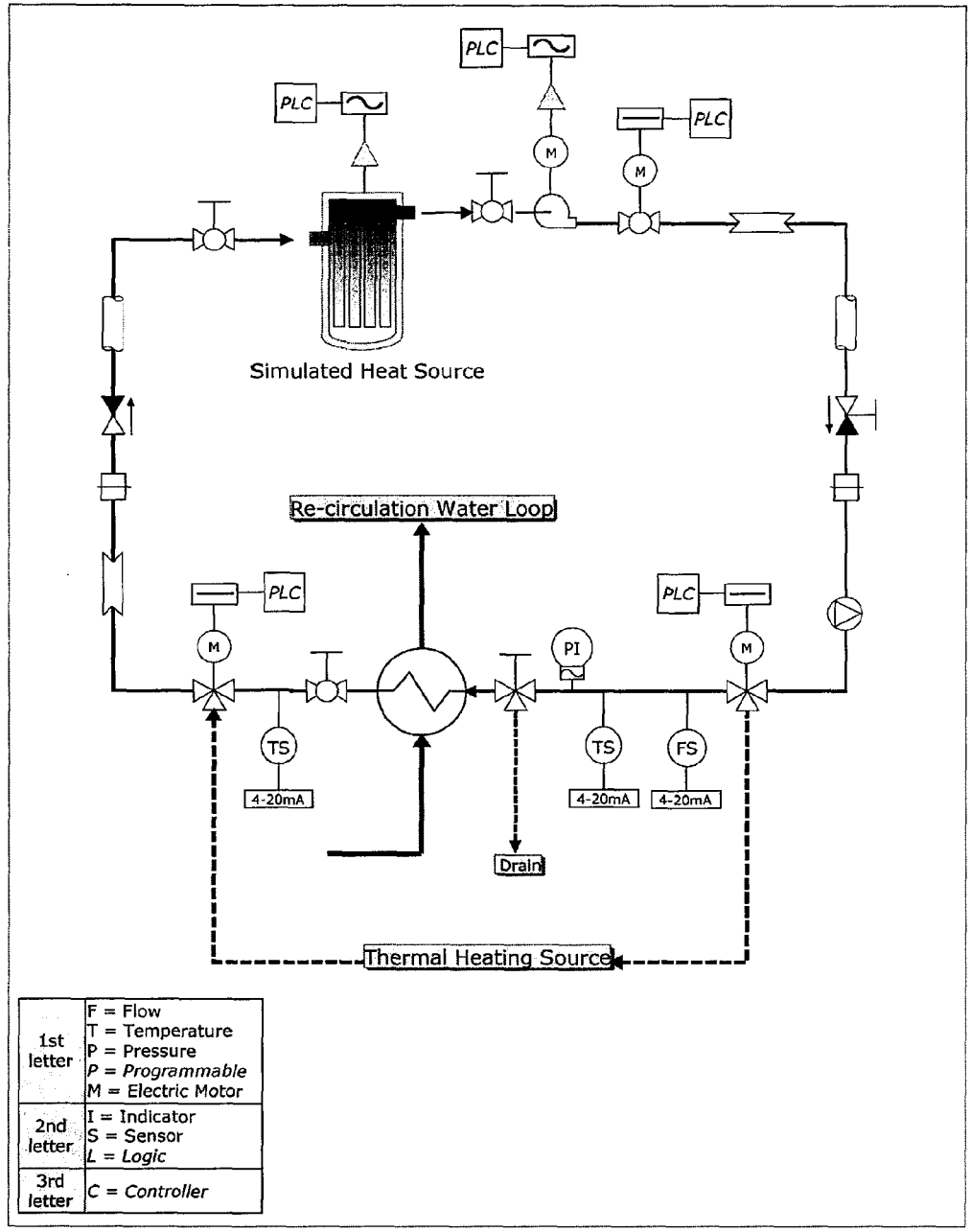
FIG. 11 is a process and instrumentation diagram of a heating step according to a preferred embodiment of the present invention.
Figure 12:
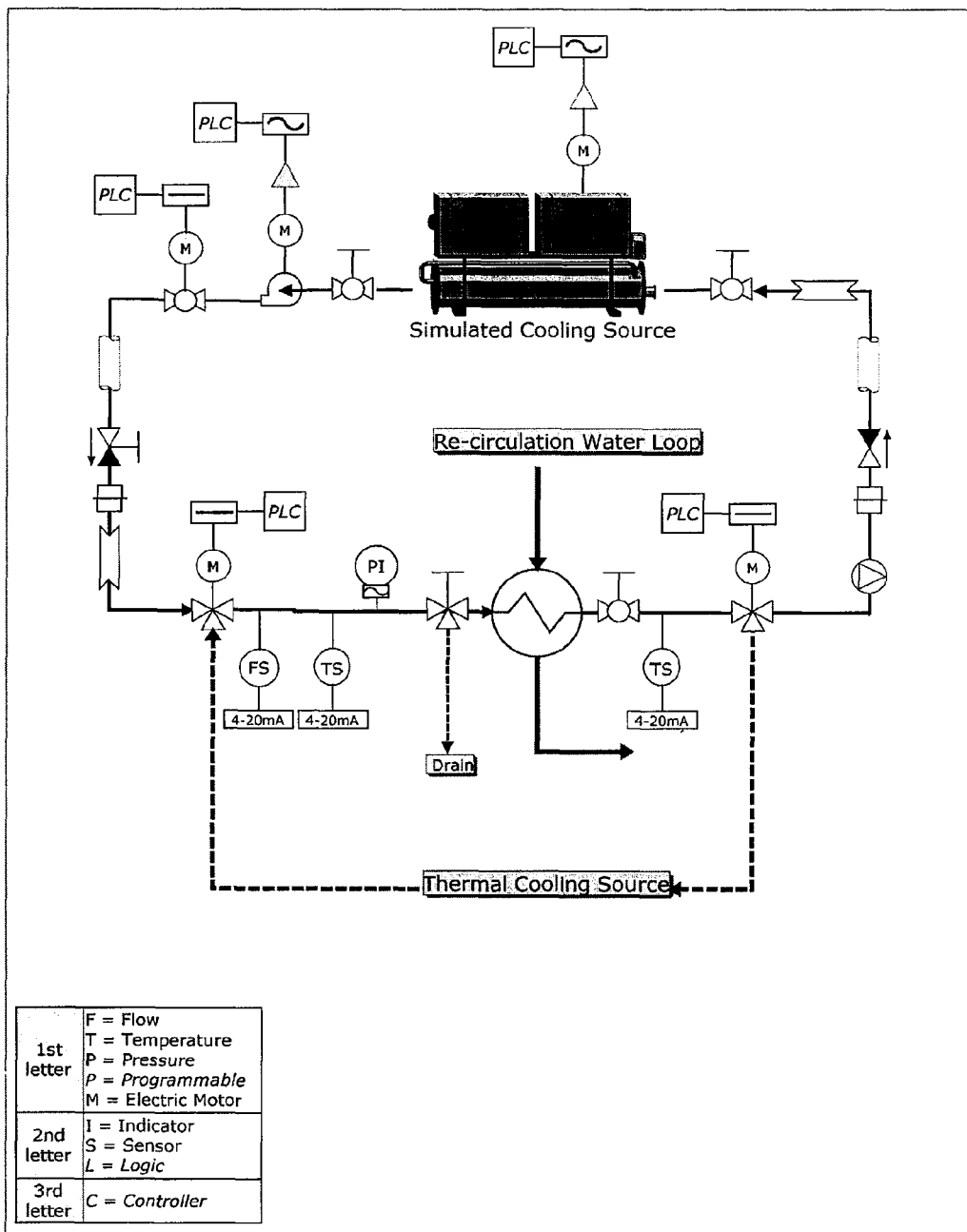
FIG. 12 is a process and instrumentation diagram of a cooling step according to a preferred embodiment of the present invention.
Figure 13:
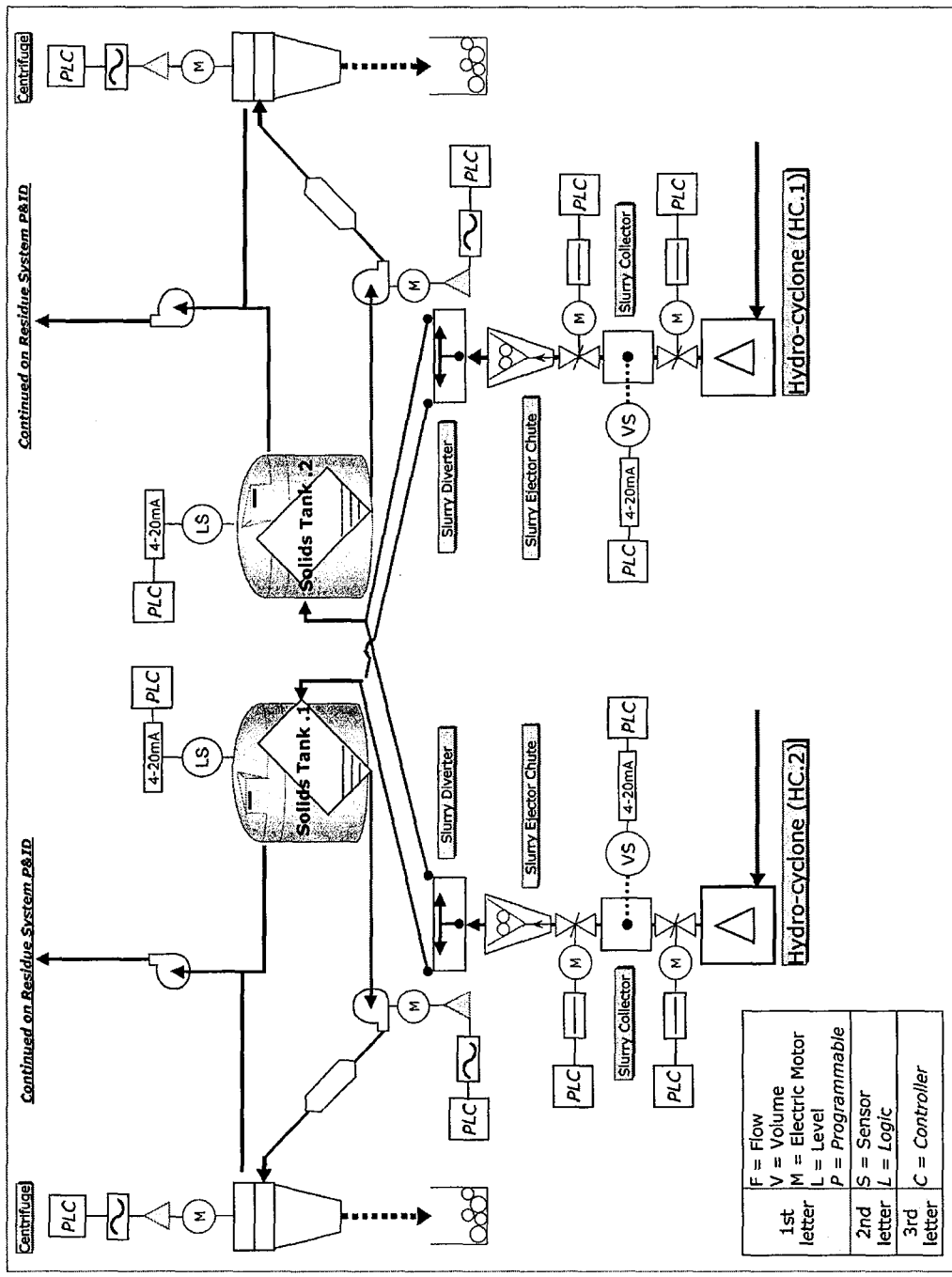
FIG. 13 is a process and instrumentation diagram of a solids recovery step according to a preferred embodiment of the present invention.
Figure 14:
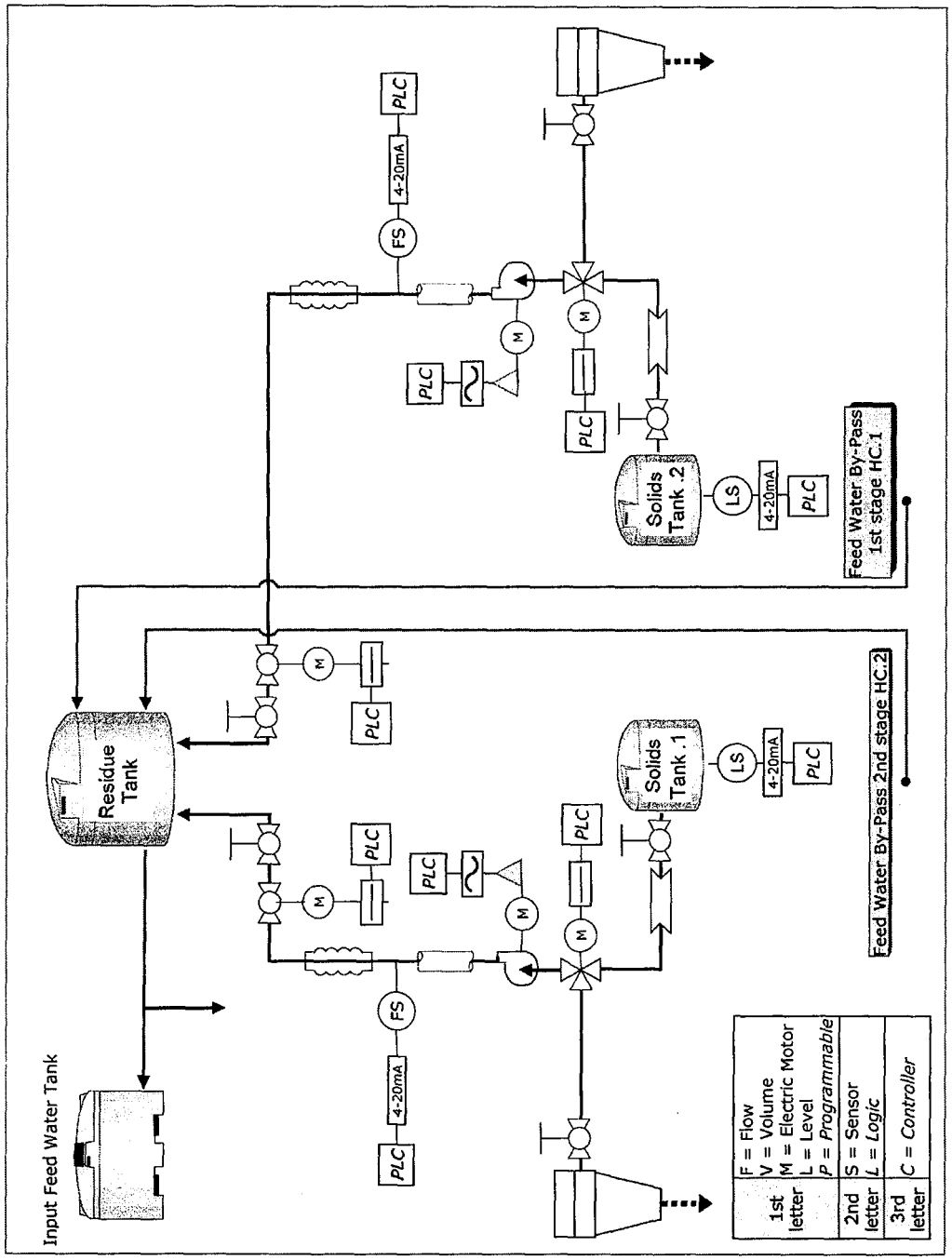
FIG. 14 is a process and instrumentation diagram of a residual solids recovery system according to a preferred embodiment of the present invention.

FIG. 2A depicts a thermal distillation system comprising an apparatus 50 of the same topology as that described above for FIG. 1 and additionally provides, by way of example only, specific details of the thermodynamics underlying the system. Tables 1 to 6 in FIG. 2B list details of the heating and cooling input temperatures, heating and coolant flow, cool module characteristics, hot module characteristics, constants and thermodynamic performance. The waste water feed 1 enters liquid stream 3 via mixer M. The liquid stream 3 flows at a substantially constant rate of 5.00 L/s throughout the liquid circuit. The liquid stream 3 enters condenser C2 at 25.0° C. and exits condenser C2 at 45.2° C. The liquid stream 3 then enters condenser C1 at 45.2° C., wherein the temperature of stream 3 increases to 63.6° C. Upon the stream exiting condenser C1, the temperature of stream 3 is further increased to 70.0° C. via heating means H. The liquid stream 3 enters evaporator E1 at 70.0° C. and exits evaporator E1 at 51.6° C. The liquid stream 3 then enters evaporator E2 at 51.6° C., wherein the temperature of stream 3 decreases to 31.4° C. Upon the stream 3 exiting E2, the temperature of stream 3 is further decreased to 25.0° C. via cooling means C. With respect to the closed loop carrier gas streams (stream 1 comprising sections 7 and 8, and stream 2 comprising sections 9 and 10), stream 1 flows at a rate of 1.14 $m^3$/s and stream 2 flows at a rate of 2.60 $m^3$/s.

The temperatures of sections 7 and 8 are 65.6° C. and 47.2° C., respectively, and the temperatures of sections 9 and 10 are 47.2° C. and 27.0° C., respectively. Accordingly, the preferred embodiment of the present invention illustrated in FIG. 2A represents an essentially adiabatic process. Such thermodynamic balance is achieved in the following two ways: (i) the energy associated with cooling liquid in stream 3 and heating the carrier air stream within evaporators E1 and E2, is equivalent to the energy associated with heating liquid in stream 3 and cooling the carrier air stream within condensers C1 and C2, respectively; and (ii) the energy associated vaporising water from the liquid in stream 3 within E1 and E2 is equivalent to the energy associated with condensing water from the carrier air stream within condensors C1 and C2, respectively. It will be appreciated that the thermal energy entering the system, primarily via the heating means, must equal the thermal energy leaving the system, primarily via the cooling means.

Figure 15:
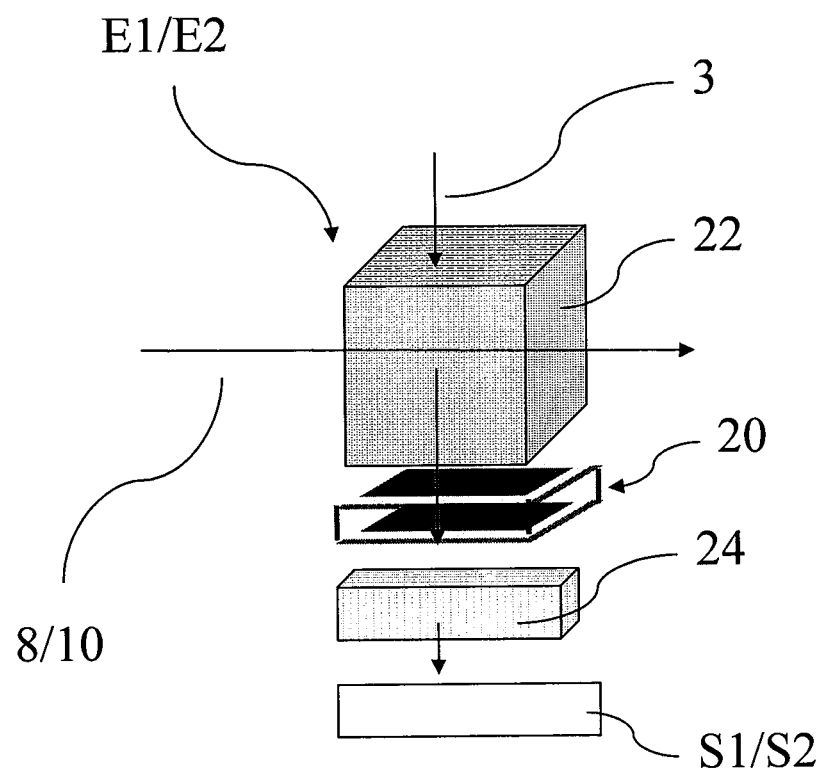
FIG. 15 depicts schematically a chemical interface arrangement of the system according to a preferred embodiment of the present invention.
Figure 16A:
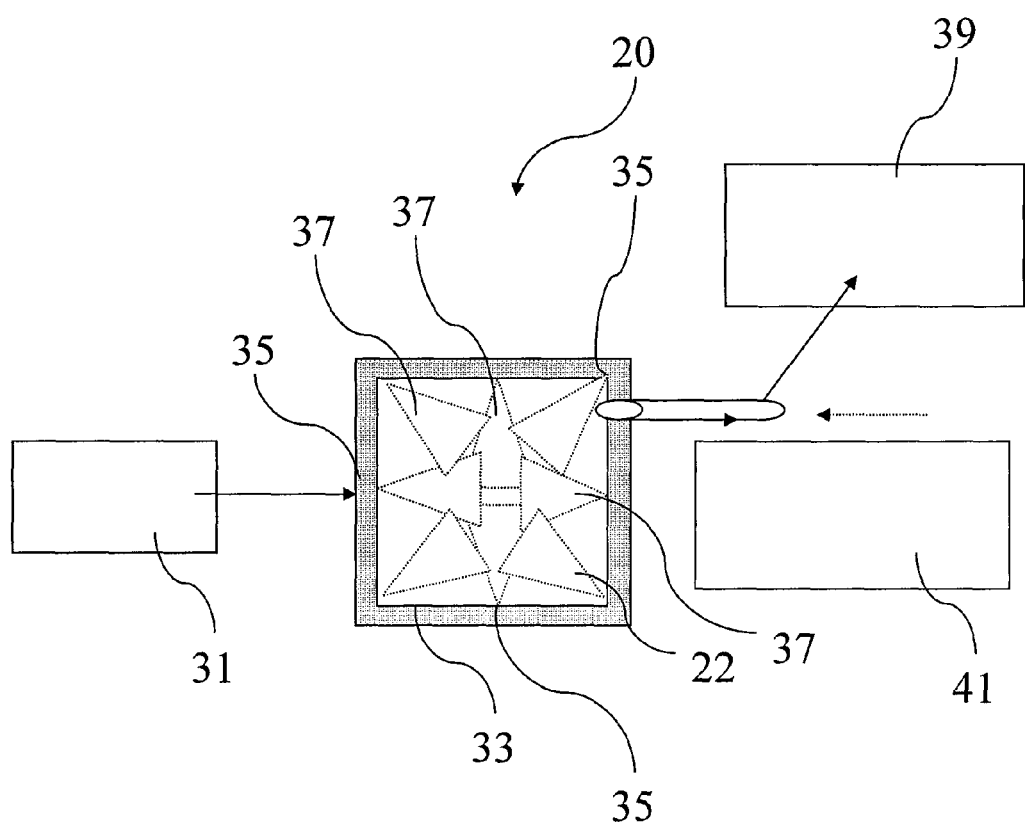
FIGS. 16A and 16B are a schematic plan view and a schematic side view, respectively, showing details of the chemical interface arrangement.
Figure 16B:
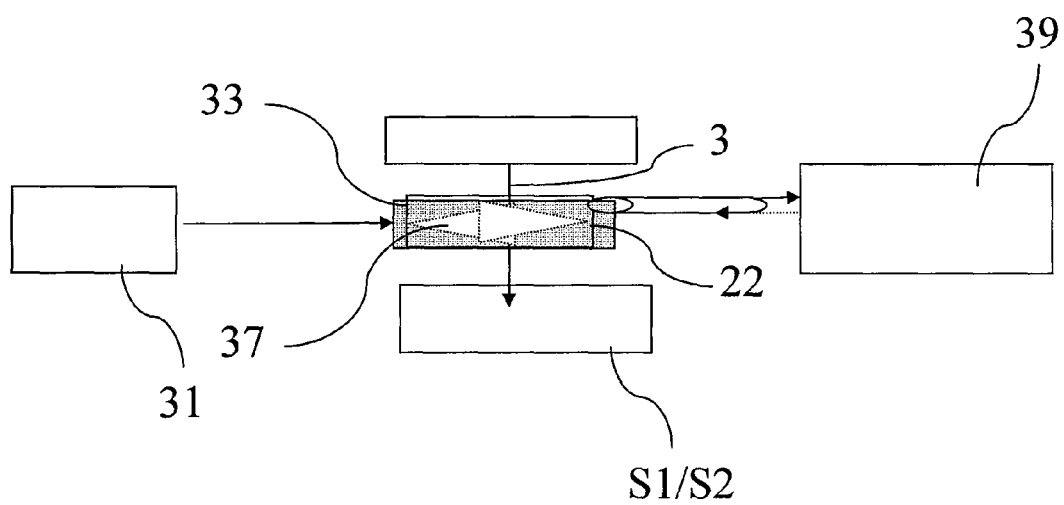

The system may further include an arrangement which supplies treatment fluid to the system to control the internal chemical environment of the system. With reference to FIGS. 15, 16A and 16B, one such arrangement comprises an interface arrangement 20 configured to supply treatment fluid at a lower position in a (respective) evaporation chamber 22 of the or each evaporator E between the evaporation "fill" material and a base tank 24 of the evaporator E1/E2. Solids separator S may comprise, for example, a hydrocyclone.

With reference to FIGS. 16A and 16B, the chemical interface arrangement 20 comprises one or more pumps 31, a distribution loop or manifold 33 into/through which the treatment fluid is pumped by pump(s) 31, the loop/manifold being configured with an arrangement of nozzles 35 through which the treatment fluid is output into the chamber 22 in the form of divergent spray patterns 37. The nozzles 35 are distributed in a more or less even manner around the interior of the chamber 22.

The interface arrangement 20 may include an arrangement 39 for venting and/or scrubbing the carrier gas, which may be necessary or desirable to compensate the system for the effects of the chemical treatment fluid upon it, the arrangement 39, more particularly, being configured to control gas pressure/volume and/or extract from the gas (e.g. by way of activated charcoal) chemicals produced as a consequence of the chemical treatment.

The interface arrangement 20 may, alternatively or additionally, include an input 41 for supplying carrier gas, which may comprise filtered, humidified air, to replenish carrier gas consumed as a result of the chemical treatment.

The system is preferably designed such that ductwork above the interface arrangement 20 minimises airflow into the chemical interface area. If high gas production from the chemical interface is likely, venting at the site of the interface may be appropriate so as to minimise effects on normal operational airflows. Alternatively, if reactions effected by the chemical treatment have the effect of consuming high volumes of carrier gas, intake of carrier gas to replenish carrier gas levels may be appropriate. Advantageously, the use of free-flowing nozzles enabling a fine, horizontal form chemical liquid spray pattern with maximal horizontal coverage of the interface area may optimise the delivery of the treatment fluid (in particular, maximising interaction and mixing between the treatment fluid and falling process liquid). Preferably the delivery volume is controllably variable, in a manner which does not compromise treatment liquid distribution pattern or droplet size.

The pump(s) 31 and valving through the loop 33 associated therewith will preferably be PLC-controlled and regulated by specific analytical instrumentation outputs (which may include pH, conductivity and density, suspended solids and/or temperature). The system may be configured to store and supply more than one treatment fluid, either independently or in combination. It may be preferable that, where the different fluid treatments are employed, they are stored in respective, independent, tanks.

Any chemical input at the interface will require control on the basis of process water chemistry (stoichiometric additions). The efficiency of mixing between process and input chemicals will need to be modelled and chemical concentration and delivery rates adjusted accordingly, to produce optimal reaction efficiency. Where applicable, the interface will need to deliver precipitated solids at a rate and size capable of hydrocyclone removal. Also where applicable, modelling of precipitate formation between hydrocyclones and condensing heat exchanges must be such as to ensure chemical addition rates do not result in heat exchanger fouling. Moreover, where applicable, process conditions must be adjusted to compensate for changes in process liquid temperatures and gas/air temperatures from interface reactions. Account must be taken of modelled vented/intake gas/air volumes and temperature changes where treatment fluid is employed. Venting and scrubbing may be necessary or appropriate in the event of chemical treatment producing high volumes of gases or hazardous/flammable gases. On the other hand, carrier gas intake may be necessary or appropriate in the event of chemical treatment resulting in consumption of high volumes of carrier gas or production of hazardous/flammable gases.

Figure 17:
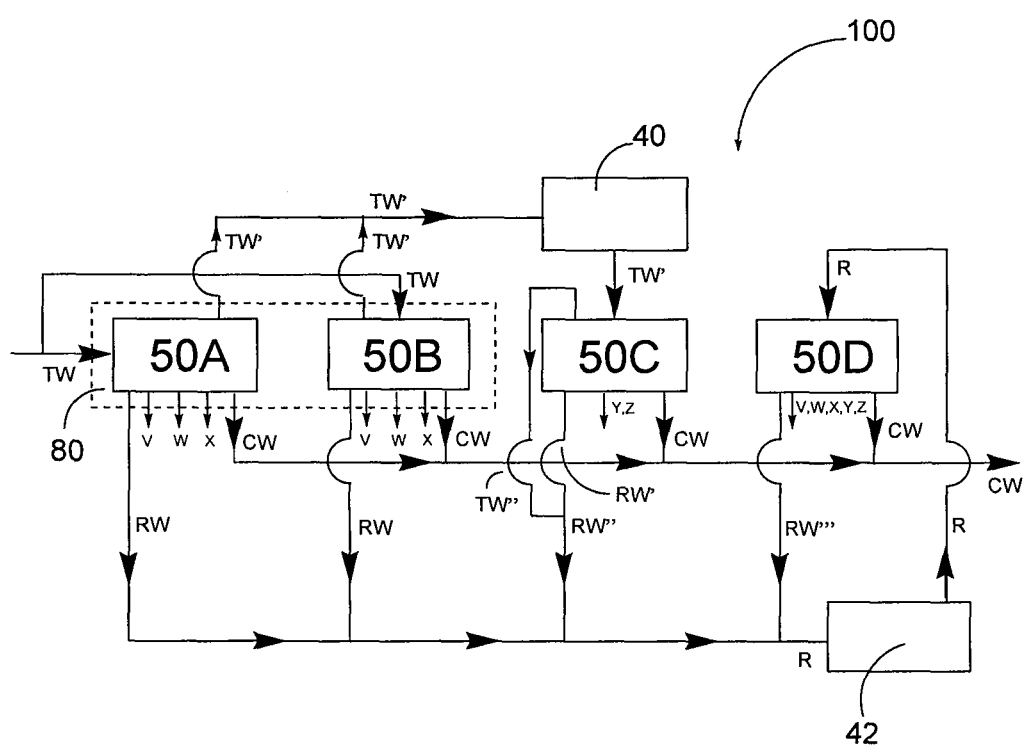
FIG. 17 depicts a multi-unit process and system according to a further preferred embodiment of the present invention.

A system 100 according to a further preferred embodiment is depicted in FIG. 17, the system 100 including four systems/apparatuses 50 according to the previously described embodiment, which are designated 50A, 50B, 50C and 50D. The system is operable for ZLD and SSH purposes. In the system 100, units 50A and 50B are operable simultaneously/in tandem, the units 50A, 50B receiving input 1 of treatable liquid containing, for example, constituents in the form of dissolved salts V, W, X, Y and Z. The treatable liquid may be input to units 50A, 50B in temporally separate stages, so that solid salts V, W and X can be extracted from the treatable liquid in succession, following each input stage, i.e. in a batchwise manner. For each input stage, following extraction of solids V, W, X, what remains TW' of the treatable liquid, which contains remaining dissolved salts Y, Z, is output from units 50A, 50B to an input water tank 40. Residual water RW which is extracted from the slurries input to solids collectors SC in units 50A and 50B (to produce solids V, W, X), is output to a residual water tank 42.

Units 50A and 50B thus operate in parallel, each contributing residual water RW which is input into tank 42 and the treatment water TW' input into tank 40, whereby production rates are higher than they would be if there were only a single unit 50 in place of them. It will be appreciated that units 50A and 50B thus constitute a single solids extraction apparatus 80, which apparatus, in other embodiments, may comprise any number of (i.e. one or more) units 50.

When enough treatment water TW' has accumulated in tank 40, treatment water TW' is output from tank 40 to unit 50C, the purposes of which, in this embodiment, is to extract solids Y, Z, which may need only extracted as a solids mixture (rather than separately harvested). Residual water RW", which is a combination of residual water RW' output from the solids collector SC of unit 50C (which remains following extraction of solids Y, Z from the slurry input to that collector) and what remains TW", of the treatment water circulating in unit 50C (following extraction of Y, Z), is also output to tank 42.

When enough residual water R has accumulated in tank 42, the residual water R is output from tank 42 to unit 50D. Because the residual water R derives from mechanical dewatering not only of the slurry rich in Y, Z in unit 50C but also of the slurries rich in V, W, X in units 50A and 50B, it contains amounts of each of V, W, X, Y and Z. In the present embodiment, unit 50D is utilised to produce an output of solids comprising a mixture of V, W, X, Y and Z. The residual water R input into tank 42 additionally includes an output of residual water RW''' resulting from mechanical dewatering to extract this solids mixture in solids collector SC of unit 4. Clean water, comprising the combined outputs from water receptacles WR in units 50A, 50B, 50C and SOD is output from the system 100, in addition to the aforementioned extracted solids.

SSH embodiments of the invention, particularly those incorporating a plurality of thermal distillation systems as described above, to may be employed for extracting/precipitating the constituent salts in any brine stream.

Of particular importance to the electronics and renewable energy industries is the production of lithium which is derived from lithium salts. Lithium salts are therefore a high value item that can be extracted using preferred embodiments of the invention.

There are two principal sources of lithium salts that can be used in the production of lithium, namely seawater, from which lithium bromide can be obtained, and brine from inland salt pans, of which there are several in Bolivia, from which lithium chloride can be obtained. Embodiments of the invention can be employed to extract both these salts in an SSH process. Due to the different constituents and associated solubilities in these two liquids, the lithium salts will precipitate out at different points in the process. However, the mechanics of the process is identical in both cases and isolation and collection of the lithium salts is a natural consequence of the SSH process and follows the same set of procedures as any of the other constituent salts in the process.

Both these salts are highly soluble and would precipitate out after many other salts. In the case of seawater, the lithium bromide is one of a number of salts in solution and is very low concentration, being only approximately 0.1 to 0.2 ppm. Extracted lithium bromide would therefore only represent a small fraction of the total salt production from seawater or brine.

By contrast, the brine under the surface of the "Salar de Uyuni" salt flat in southwest Bolivia, is exceptionally rich in lithium chloride, containing 50 to 70% of the world's known lithium reserves, i.e. approximately 5,000,000 tonnes. The brine is a saturated solution of sodium chloride, lithium chloride, magnesium chloride and borax in water. Lithium is concentrated in the brine under the salt crust at a relatively high concentration, of about 0.3%. The high concentration of lithium chloride and comparatively simple chemistry of the saturated brine make it ideally suited to extraction using preferred embodiments of the present invention. In fact, all four fractions have significant industrial and economic value and are able to be separated by means of an SSH system and method embodying the invention.

Advantageously, preferred embodiments of the invention provide a system and process in which the "distilled" liquid and separated solids can be output continuously. The embodiments have particular applicability to heavy saline water (e.g. seawater) and heavy TDS streams generally, in respect of which membrane and reverse-osmosis technologies cannot be effectively used. Because the system and process embodying the invention do not involve membranes, the problem of clogging (associated with such membranes) is eliminated. Because the embodiments operate at comparatively low temperature, scaling or fouling can be eliminated or minimised as hereinbefore described.

Advantages of ZLD and SSH systems and processes according to preferred embodiments of the present invention over standard solids recovery approaches include:
  elimination of a need for multiple processing stages (e.g. evaporation, chemical manipulation and cooling), steps or ancillary equipment (e.g. brine concentrators and crystallisers) to deliver SSH and ZLD whilst potentially incorporating chemical manipulation where such manipulation can improve volume and value of recovered solids;
  delivery of a commercially valuable stream of separated solids via batch processing, instead of simply generation of an output of mixed solids;
  operability in combination with basic ZLD option (SSH not being an essential processing feature of the invention);
  optional integrated chemical water treatments to manipulate or improve volume and value of recovered solids; and
  ability to combine the system/process with complementary water treatment processes/systems and eliminate brine streams and generate multiple sources of new revenue.

SSH, in the preferred embodiments of the invention employing it, in contrast to the ZLD process alone, involves a batch processing methodology, where input treatable liquid volumes into the process are fixed and the volume is then reduced prior to the intake of another fixed volume. This process results in the sequential dissolution of solids based upon their relative solubility. As for ZLD, a solids slurry is generated but for SSH, the slurry undergoes sequential distribution into separated slurry streams. As for ZLD, further dewatering options can be utilised and the process produces no liquid stream other than the clean recovered water.

A system embodying the invention may include a plurality of systems/apparatuses each of which in itself is a preferred embodiment of the invention, and may thus enable residual brine processing in combination with batch processing, evaporation chamber design which facilitates free flowing, central solids collection, a pump and customised hydrocyclone solids separator associated with each evaporation chamber.

The system according to particular preferred embodiments of the invention incorporates a chemical interface feature located at the base of each evaporation chamber, between the evaporation 'fill' material and base tank, a chemical pump and controlled, valved chemical distribution system associated with the evaporators in adjacent stages carrying chemical interface sections, a venting/scrubber or humidified air intake facility to cater to the potential production or consumption of gases resulting from the chemical treatment.

The system according to particular preferred embodiments of the invention incorporates a customised valve and slurry distribution system with multiple slurry output streams, provision for additional slurry dewatering using standard mechanical or thermal methods applicable to each individual slurry stream, provision for use of available waste heat for thermal dewatering, and/or conduits to enable residual water from mechanical dewatering to re-enter the water treatment process, thus ensuring the process produces no liquid stream other than the clean recovered liquid.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The claims defining the invention are as follows:
1. A thermal distillation system comprising:
  a liquid circuit for carrying a stream of treatable liquid from which liquid is to be extracted;
  a liquid supply input for supplying the treatable liquid to the liquid circuit;
  at least one pump for circulating the treatable liquid stream through the liquid circuit;
  a heat source arranged on the liquid circuit for heating the liquid in the treatable liquid stream; and
  one or more coolers arranged on the liquid circuit for cooling the liquid in the treatable liquid stream;
  wherein the liquid circuit comprises a first section defined between an output from the heat source and an input to the cooler(s), and a second section defined between an output from the cooler(s) and an input to the heat source, the system further comprising:
a plurality of distillation stages, each stage including an evaporator arranged on the first section to vaporise liquid from the treatable liquid stream, a condenser arranged on the second section so as to be in heat exchange relationship with the treatable liquid stream in the second section to effect condensation in the condenser and heating of the treatable liquid stream in the second section, a carrier circuit, on which the evaporator and condenser are arranged, for carrying a stream of carrier gas, and an output for outputting from the condenser liquid extracted from the treatable liquid by the distillation stage;
at least one pump for circulating the carrier gas through each carrier circuit at ambient pressure; and
at least one controller for varying flow rate of the carrier gas in each carrier circuit according to the temperatures of liquid input into and output from each evaporator;
wherein the stages are arranged such that their evaporators are disposed along the first section in a direction from the heat source to the cooler(s) and their condensers are disposed in corresponding order along the second section in a direction from the heat source to the coolers; and
the carrier circuits comprise physically independent loops, such that each stream of carrier gas is operationally independent of the stream of carrier gas in each other distillation stage.

2. A system according to claim 1, the system being configured such that the temperature of liquid output from the heat source does not exceed its boiling point and the temperature of liquid output from the cooler(s) is not below its freezing point.

3. A system according to claim 1, including at least one controller for varying flow rate of the carrier gas in each carrier circuit according to the temperatures of liquid input into and output from each evaporator and flow rate of liquid in the liquid stream.

4. A system according to claim 1, the system being operable such that, in the or each pair of adjacent stages, the carrier gas flowing from the condenser to the evaporator in the stage which is first in a direction from the heat source to the cooler(s) is maintained at the same temperature as the carrier gas flowing from the evaporator to the condenser in the stage which is second in said direction.

5. A system according to claim 1, wherein the number of stages is two.

6. A system according to claim 1, the system including at least one pump operable to input treatment fluid into the liquid circuit and/or at least one of the carrier circuits to effect chemical control within the system.

7. A system according to claim 1, including solid separators for extracting solids which precipitate out of the liquid stream as liquid is extracted therefrom.

8. An extraction system including:
a first apparatus and a second apparatus, each apparatus comprising at least one system according to any one of the preceding claims, wherein:
the input of the or each system of the first apparatus is arranged for receipt of a treatable liquid comprising a plurality of extractable constituents, and the first apparatus is operable to extract from the treatable liquid at least one constituent in solid form; and
the input of the or each system of the second apparatus is arranged for receipt of liquid from which the at least one constituent has been extracted by the first apparatus, and the second apparatus is operable to extract from that liquid at least one further constituent in solid form.

9. A process for extracting a liquid from a treatable liquid, comprising the steps of:
circulating a stream of treatable liquid in a liquid circuit;
heating the liquid in the liquid stream at a heating position on the liquid circuit;
circulating at ambient pressure, in respective carrier gas circuits, respective streams of carrier gas, the carrier has circuits comprising physically independent loops such that they are operationally independent, and contacting, at successive evaporation positions along liquid circuit downstream of the heating position, the carrier gas in respective carrier gas streams, in order from a first one of the carrier gas streams to a final one of the carrier gas streams, with the treatable liquid to effect evaporation of liquid from the treatable liquid, thereby forming vapour which is carried by the carrier gas in the carrier circuits and effecting cooling of the treatable liquid in the circuit at the evaporation positions;
cooling the liquid in the liquid stream at a cooling position downstream of the evaporation positions;
effecting, at successive positions along the circuit downstream of the cooling position and upstream of the heating positon, heat exchange between the liquid in the liquid stream and vapour carried in respective carrier gas streams, in order from the final carrier gas stream to the first carrier gas stream, to effect condensation of liquid from the carrier gas stream and heating of the treatable liquid in the circuit upstream of the heating positon; and
removing the condensed liquid,
wherein the flow rate of carrier gas in each circuit is varied according to the temperatures of liquid input into and output from each evaporation position.

10. A process according to claim 9, wherein in the or each pair of adjacent carrier gas streams, the temperature of the carrier gas flowing from the condensation position to the evaporation position in the carrier gas stream which is first in the direction from the heating position to the cooling position and the temperature of the carrier gas flowing from the evaporation position to the condensation position in the carrier gas stream which is second in said direction are maintained equal.

11. A process according to claim 9, wherein a supply of treatable liquid to the liquid circuit is intermittent whereby the extraction is carried out in a batchwise manner.

12. A process according to claim 9, including separating, from the liquid circuit, solids which precipitate out of the liquid stream as liquid is extracted therefrom.

13. A process according to claim 9, wherein treatment fluid is input into the liquid circuit and/or at least one of the carrier circuits to effect chemical control within the process.

14. A process comprising utilizing the system according to claim 1 to concentrate and/or precipitate solids dissolved or dispersed in the treatable liquid.

* * * * *